US008830993B1

(12) United States Patent
Dublin et al.

(10) Patent No.: US 8,830,993 B1
(45) Date of Patent: Sep. 9, 2014

(54) EXTENSIBLE TIME SPACE SWITCH SYSTEMS AND METHODS FOR HIGH CAPACITY MULTI-SERVICE APPLICATIONS

(75) Inventors: Ian Dublin, Nepean (CA); Jeffery Thomas Nichols, Marietta, GA (US); Peter Bengough, Kanata (CA)

(73) Assignee: Ciena Corporation, Hanover, MD (US)

( * ) Notice: Subject to any disclaimer, the term of this patent is extended or adjusted under 35 U.S.C. 154(b) by 184 days.

(21) Appl. No.: 13/326,111

(22) Filed: Dec. 14, 2011

Related U.S. Application Data

(63) Continuation-in-part of application No. 12/788,453, filed on May 27, 2010.

(51) Int. Cl.
H04L 12/50 (2006.01)
(52) U.S. Cl.
USPC .......................................... 370/376; 370/369
(58) Field of Classification Search
USPC .......... 370/369, 370, 371, 372, 376, 386–388
See application file for complete search history.

(56) References Cited

U.S. PATENT DOCUMENTS

| | | | |
|---|---|---|---|
| 5,617,414 A * | 4/1997 | Bergkvist et al. | 370/374 |
| 5,978,370 A * | 11/1999 | Shively | 370/370 |
| 6,366,579 B1 | 4/2002 | Lindberg | |
| 6,704,307 B1 | 3/2004 | Graves et al. | |
| 6,834,049 B1 | 12/2004 | Tomar et al. | |
| 6,970,455 B2 | 11/2005 | Garg et al. | |
| 7,039,072 B1 | 5/2006 | Shivji et al. | |
| 7,394,806 B2 | 7/2008 | Beshai et al. | |
| 7,606,262 B1 * | 10/2009 | Beshai et al. | 370/468 |
| 7,760,716 B2 | 7/2010 | Beshai | |
| 2002/0191588 A1 * | 12/2002 | Personick | 370/352 |
| 2003/0112031 A1 * | 6/2003 | Agrawal et al. | 326/41 |
| 2004/0100994 A1 * | 5/2004 | Miller | 370/503 |
| 2007/0140240 A1 * | 6/2007 | Dally et al. | 370/389 |
| 2010/0158005 A1 * | 6/2010 | Mukhopadhyay et al. | 370/392 |
| 2010/0161938 A1 * | 6/2010 | Heddes et al. | 712/11 |
| 2011/0292932 A1 * | 12/2011 | Nichols et al. | 370/376 |

FOREIGN PATENT DOCUMENTS

WO    WO 2008080122 A2 *  7/2008

* cited by examiner

Primary Examiner — Andrew Chriss
Assistant Examiner — Jose Perez
(74) Attorney, Agent, or Firm — Clements Bernard PLLC; Christopher L. Bernard; Lawrence A. Baratta, Jr.

(57) ABSTRACT

A time-space switch in a ring architecture includes input circuitry including N links each receiving M timeslots, a two-dimensional matrix of a plurality of switching circuits, the two-dimensional matrix is configured to receive from the input circuitry each of the M timeslots from the N links in a pipelined manner, and output circuitry including N links configured to receive any of the M timeslots from any of the N links from the two-dimensional matrix. The input circuitry, the two-dimensional matrix, and the output circuitry are arranged in a ring architecture therebetween. A link encoding protocol method performed in electrical circuitry includes receiving a plurality of time slots, grouping the plurality of time slots into time slot groups, performing a cyclic redundancy check between adjacent time slot groups, 64/65B encoding the time slot groups, and forward error correction encoding a plurality of 65B codewords from the 64/65B encoding.

11 Claims, 17 Drawing Sheets

EXTENSIBLE TIME SPACE SWITCH SYSTEMS AND METHODS FOR HIGH CAPACITY MULTI-SERVICE APPLICATIONS

CROSS-REFERENCE TO RELATED APPLICATION(S)

This application is a continuation-in-part of co-pending U.S. patent application Ser. No. 12/788,453 filed May 27, 2010, and entitled "EXTENSIBLE TIME SPACE SWITCH SYSTEMS AND METHODS," the contents of which are incorporated in full by reference herein.

FIELD OF THE INVENTION

The present disclosure relates generally to switching systems and methods, and more particularly, to extensible time-space switch systems and line encoding methods utilizing a structure and a pipeline to address increasing fabric switching capacity, increasing the line rate of the interconnections within the time-space switch, and increasing the level of system-on-chip (SOC) integration.

DESCRIPTION OF THE BACKGROUND ART

Time-division multiplexed (TDM) switch fabrics are utilized in a variety of network applications for switching Optical Transport Network (OTN), Synchronous Optical Network (SONET), Synchronous Digital Hierarchy (SDH), Ethernet, and the like. Numerous challenges exist in designing next generation time-division multiplexed (TDM) switch fabrics realized in Application Specific Integrated Circuits (ASICs), Field Programmable Gate Arrays (FPGAs), and other integrated circuits. For example, design challenges include increasing fabric switching capacity, increasing the line rate of the interconnections within the switch fabric, and increasing the level of system-on-chip (SOC) integration (e.g., by incorporating a packet switch, or another independent function, in the ASIC together with the TDM switch). Conventionally, a time-space switch and a packet switch are realized in separate devices, e.g. different ASICs.

A time-space switch has N input links of TDM data divided into M timeslots. Each of the N output links can select any of the M timeslots from any of the N input links. Each output pair ($m_{out}$, $n_{out}$) can select from any of the input pairs ($m_{in}$, $n_{in}$) without blocking. The capacity (or throughput) of a time-space switch is a function of (a) the number of links, N, and (b) the throughput (or bit rate) of each link. As the capacity of networks increase, so do the requirements of the switching equipment used in these networks. By consequence, the trend in switching equipment is towards systems that support higher link rates, as well as a larger number of links. The techniques and methods used to implement these systems need to accommodate scalability accordingly. In today's electronic systems it is common to transfer digital data between components using high speed serial (HSS) links. In order for these high speed serial links to be reliable, a physical layer encoding scheme is typically required. Physical layer encoding is required to ensure sufficient transition density and DC balance for receivers to recover the signal. Encoding may also be required to correct for errors introduced in transmission. Physical layer encoding addresses these issues by transforming the transmitted data in a systematic fashion and, as necessary, adding a specified amount of redundancy. With prior knowledge of the encoding scheme used at the transmitter, the receiver can make use of this information to improve the integrity of the received data. However, a fundamental tradeoff exists between maximizing the degree of improved reliability, while minimizing the amount of additional overhead (redundancy) that is added at the transmitter.

Conventionally, there is a lack of a unified encoding standard that is universal in switch system applications. The most common standard encoding scheme used for serial links that are driven across system backplanes is 8B/10B. With this scheme, the serial transmit data is transformed into a sequence of discrete control characters and data characters. Special control characters are used to delineate the start and end of packets, and the idle regions between packets. The interface to a time-space switch may also use the control characters to delineate and synchronize switch frames launched into the switch fabric. The 8B/10B protocol is engineered to offer good transition density and DC balance, albeit at the expense of an additional 25% of overhead (since 2 bits are added to every 8-bit input character to derive a 10-bit output character). Furthermore, the 8B/10B does not offer any error correction capacity, which has become a requirement for reliable data integrity as link speeds increase. As such, additional overhead is required on top of 8B/10B to add Forward Error Correction (FEC).

Once the framed serial data is reliably received, a simple timeslot interchanger (TSI) switch can be implemented by writing timeslot values into a Random Access Memory (RAM) and then reading output values in a new order. Other methods include writing the timeslot data into registers and using multiplexers to select the order of the output timeslots. Adding more input and output links introduces a spatial dimension to the timeslot interchanger and results in a time-space switch. Each output link may select any timeslot from any input link for each output timeslot. However, interconnect complexity increases exponentially as the spatial dimension grows, resulting in long high fan-out nets which make it difficult to route and meet the high-speed timing constraints. By consequence, traditional implementation methods break down as the size of the switch grows, and alternative techniques are required to achieve the necessary scalability for today's systems.

BRIEF SUMMARY OF THE INVENTION

In an exemplary embodiment, a time-space switch in a ring architecture includes input circuitry including N links each receiving M timeslots; a two-dimensional matrix of a plurality of switching circuits, wherein the two-dimensional matrix is configured to receive from the input circuitry each of the M timeslots from the N links in a pipelined manner; and output circuitry including N links configured to receive any of the M timeslots from any of the N links from the two-dimensional matrix. The input circuitry, the two-dimensional matrix, and the output circuitry are arranged in a ring architecture therebetween. The time-space switch may further include a packet switch disposed within the ring architecture and included in same device as the input circuitry, the two-dimensional matrix, and the output circuitry, wherein the packet switch shares high speed serial links with the time-space switch. The time-space switch may further include circuitry disposed within the ring architecture and included in same device as the input circuitry, the two-dimensional matrix, and the output circuitry, wherein the circuitry is configured to perform functions independent of the two-dimensional matrix in the same device while sharing the input circuitry and the output circuitry therewith. Physically, the input circuitry, the two-dimensional matrix, and the output circuitry may be arranged in the ring architecture, and logically, input data flows from the input circuitry orthogonally to the output circuitry in an offset two dimensional fashion where pipelining wraps around to a top of the two-dimensional matrix. The ring architecture may include four quadrants each including part of the input circuitry, the two-dimensional matrix, and the output circuitry. The two-dimensional matrix may be partitioned into the four quadrants evenly so that each quadrant contains same switching blocks and input and output buses.

Each of the four quadrants may include duplex serializer-deserializer links; four Memory Tiles interconnected therebetween; a Configuration Tile disposed to a first of the four Memory Tiles; and a Frame Input Engine and a Frame Output Engine interconnected to the four Memory Tiles and the duplex serializer-deserializer links. Each of the four Memory Tiles is a 32×32 Memory Tile and may include a plurality of 16×16 Memory Tiles; and pipelining circuitry to read in and read out data from the plurality of 16×16 Memory Tiles and inputs to the 32×32 Memory Tile. The time-space switch may further include a write activity manager configured to reduce switch power in each of the plurality of switching circuits using a write activity memory for activity synchronization with memory in the plurality of switching circuits. The input circuitry, the two-dimensional matrix, and the output circuitry may include a system on a chip, and the system on a chip may include packet switching logic disposed thereon. The time-space switch may further include a Switch Link Protocol for link encoding over the input circuitry, the two-dimensional matrix, and the output circuitry; wherein the Switch Link Protocol includes selectable forward error correction and a flexible number of timeslots. The forward error correction may include one of a Fire Code and a BCH2 code.

In another exemplary embodiment, a switch with a Switch Link Protocol providing link encoding thereon includes a two-dimensional matrix of a plurality of switching circuits, wherein the two-dimensional matrix is configured to receive and transmit in a pipelined manner; an Switch Link Protocol line encoding for encoding data through the two-dimensional matrix, the Switch Link Protocol includes selectable forward error correction, flexible serial data rates, and flexible number of timeslots. The Switch Link Protocol line encoding may provide link encoding of variable length switch frames by mapping 8B10B control characters into an 64B65B format and wrapping 32 65B encoded words with one of an 11-bit burst error correcting code and a 16 bit error correcting code. The selectable forward error correction may include one of a 2112-bit frame for higher quality backplane links and an interleaved BCH2 code for higher loss backplane links.

In yet another exemplary embodiment, a link encoding protocol method performed in electrical circuitry includes receiving a plurality of time slots; grouping the plurality of time slots into time slot groups; performing a cyclic redundancy check between adjacent time slot groups; 64/65B encoding the time slot groups; and forward error correction encoding a plurality of 65B codewords from the 64/65B encoding. The link encoding protocol method may include selectable forward error correction, flexible serial data rates, and flexible number of timeslots. The link encoding protocol method may further include utilizing one of a 2112-bit frame for higher quality backplane links and an interleaved BCH2 code for higher loss backplane links for the forward error correction encoding. The link encoding protocol method may further include scrambling forward error correction frames to ensure DC-balance, ensure sufficient transition density, and to ensure forward error correction block synchronization. The grouped plurality of time slots may include sequential time slots.

BRIEF DESCRIPTION OF THE SEVERAL VIEWS OF THE DRAWING(S)

Exemplary and non-limiting embodiments of the present disclosure are illustrated and described herein with reference to various drawings, in which like reference numbers denote like method steps and/or system components, respectively, and in which.

Figure 10:
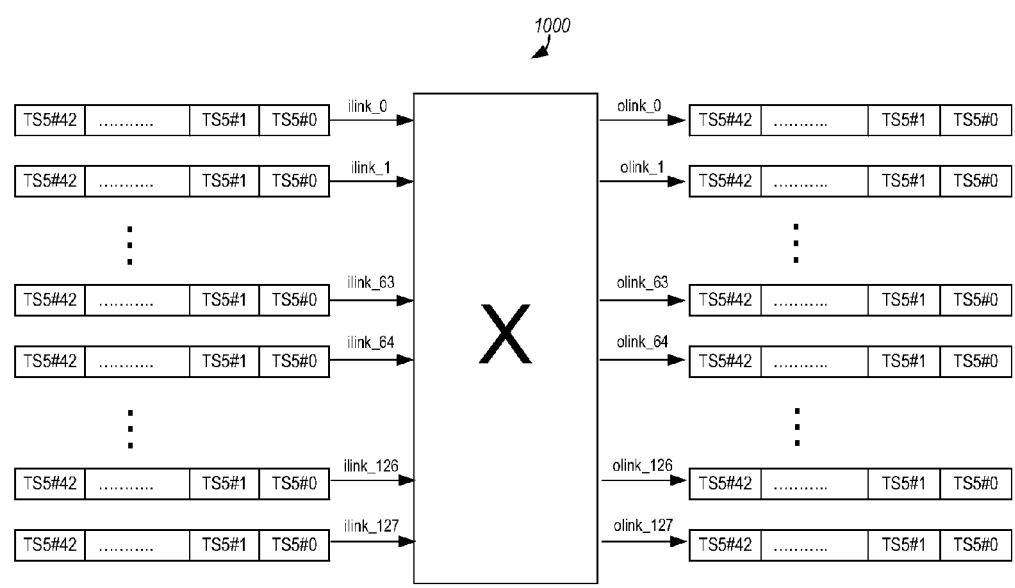
FIG. 10 is a diagram of the time-space view of TS5 granularity timeslots going into and out of any of the plurality of switching devices of FIG. 8.
Figure 11:
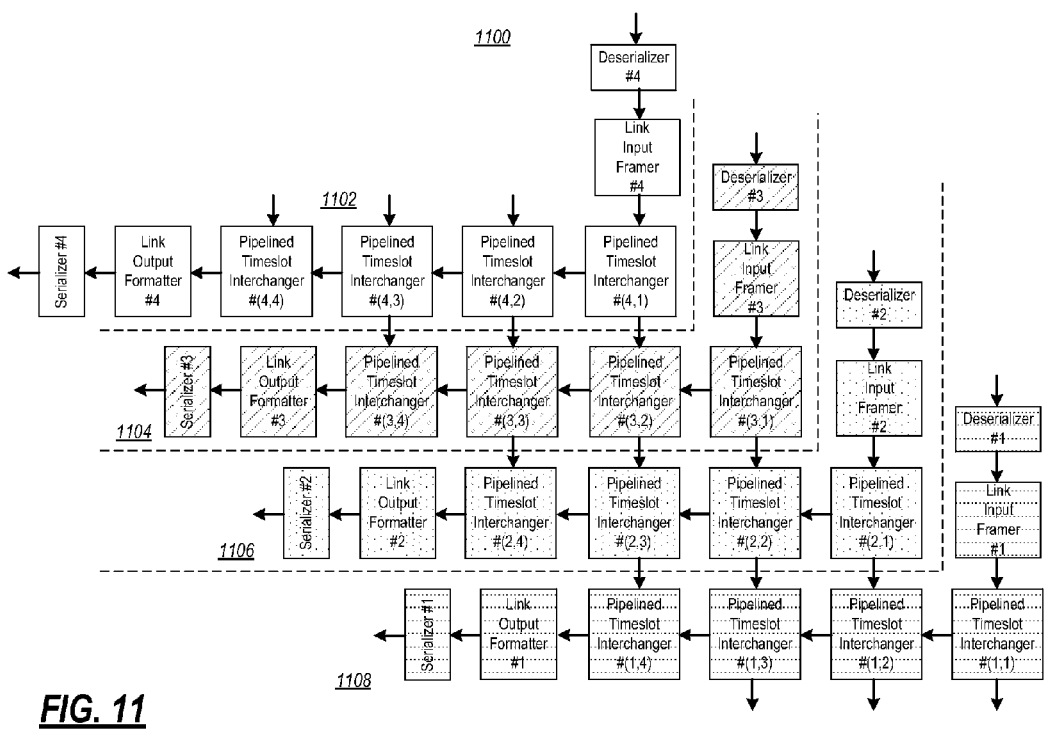

FIG. 11 is a functional block diagram of a switch matrix for the switch engine of FIG. 10; The offset pipelining is different from FIG. 1 and FIG. 2, and is amenable to a ring architecture. The switch matrix is segmented into quadrants and pipelining wraps from the bottom to the top.

Figure 12:
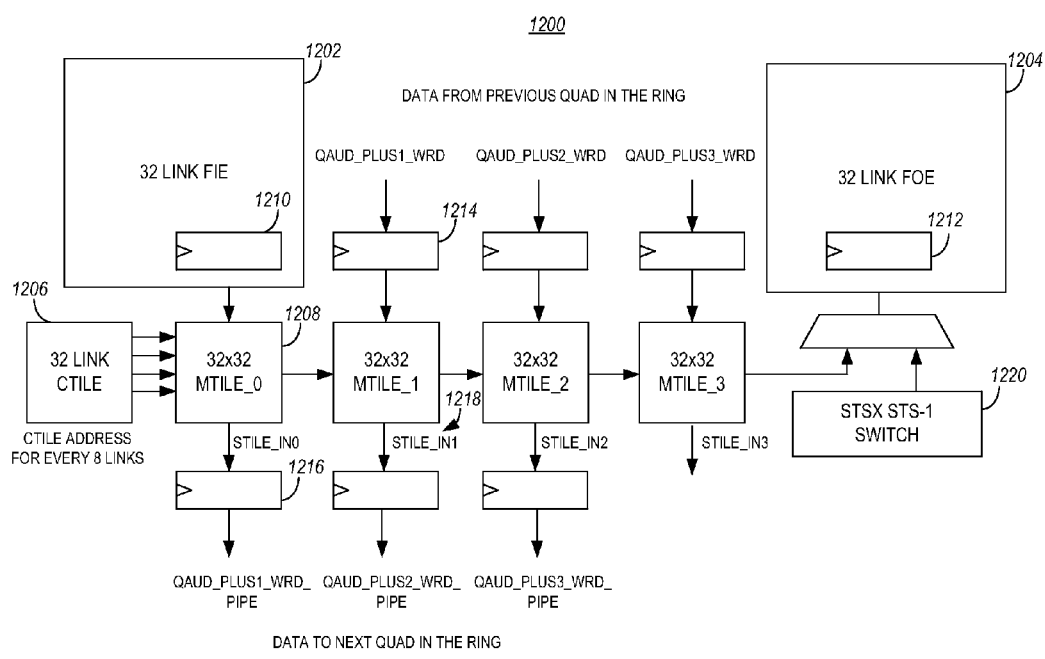
Figure 13:
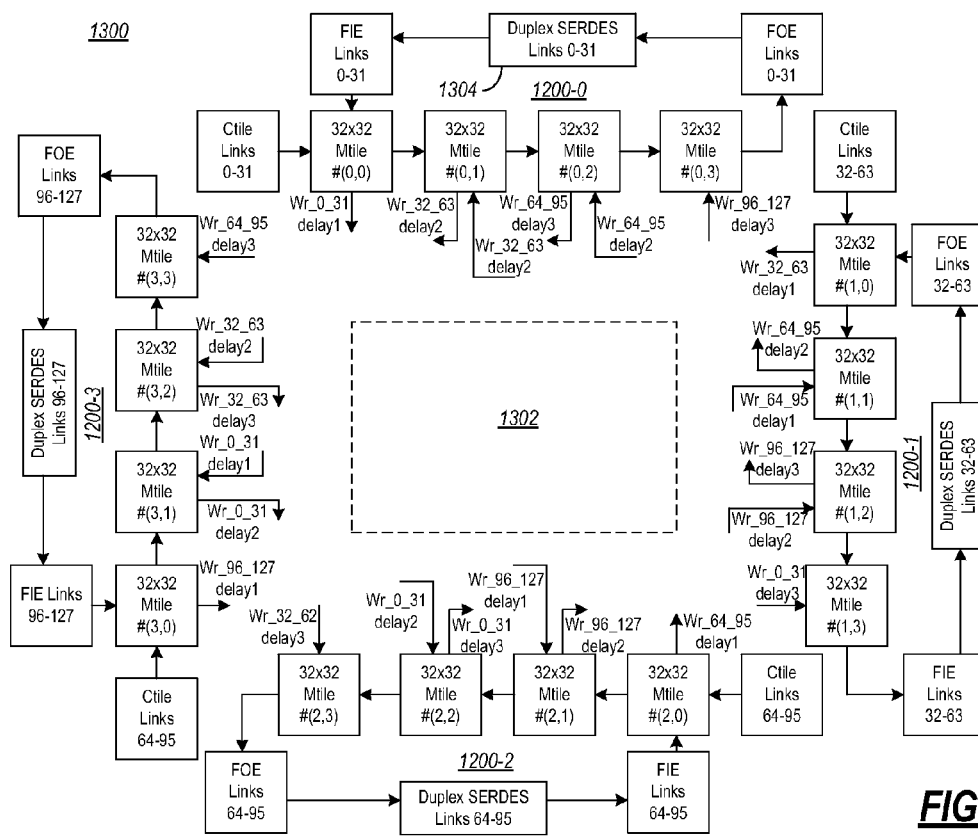
Figure 14:
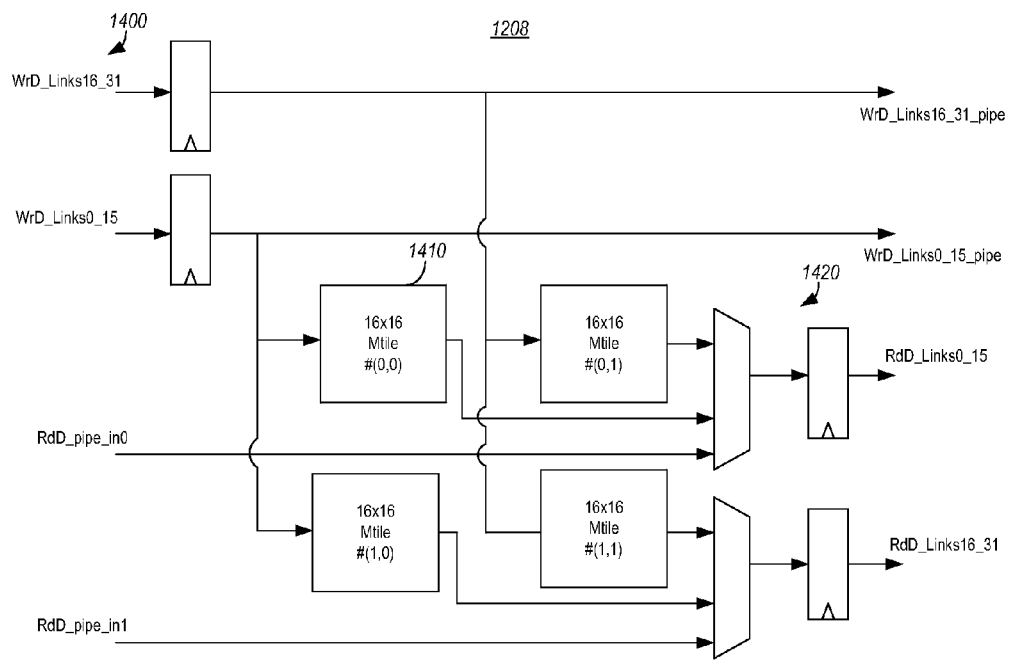
Figure 15:
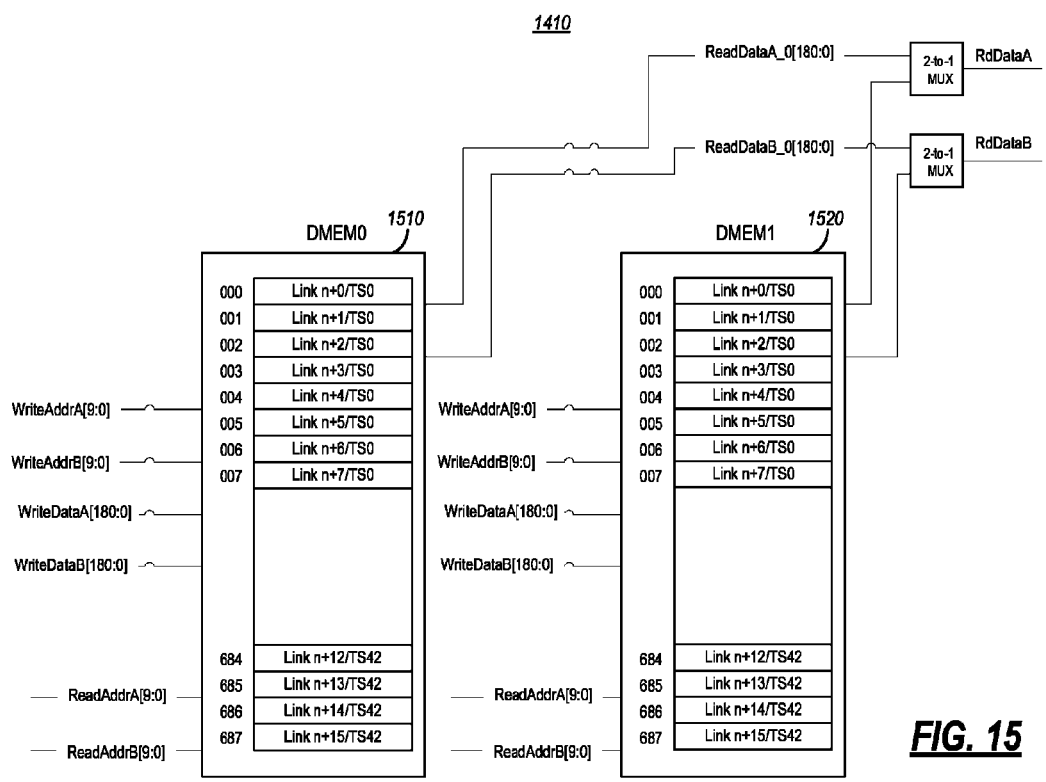
Figure 16A:
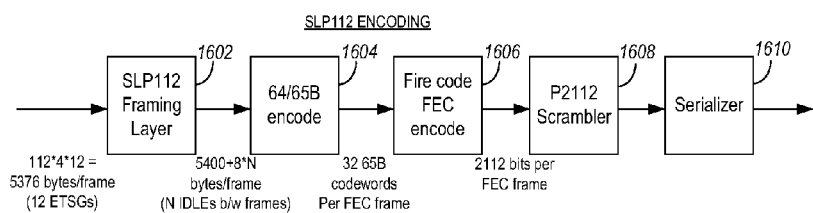
Figure 16B:
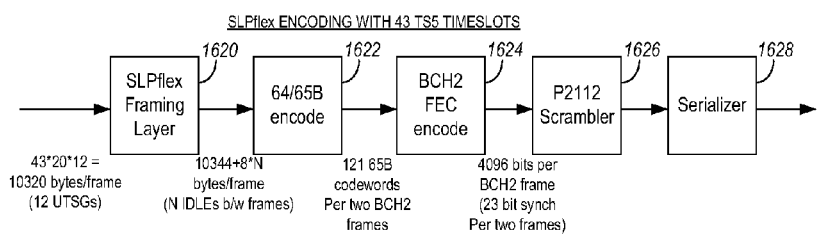
Figure 16C:
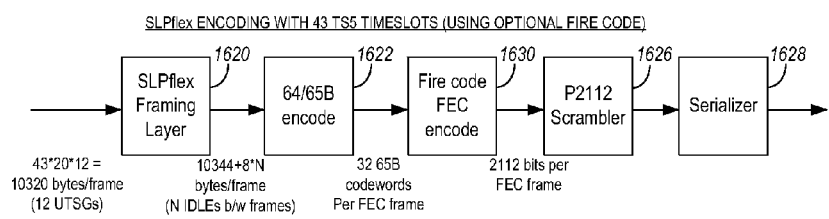
Figure 17:
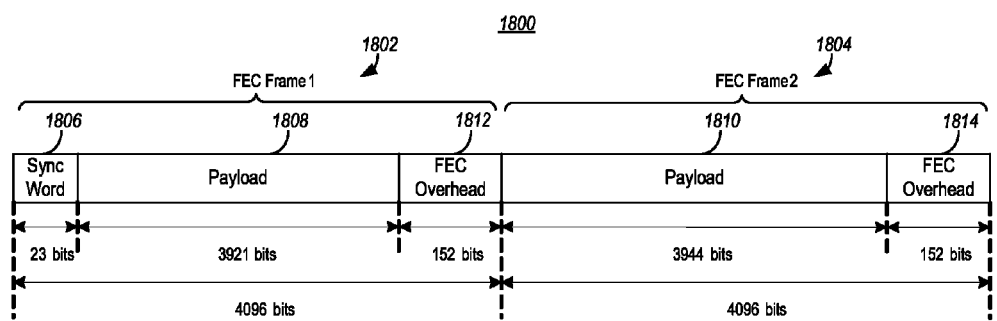

FIG. 12 is a block diagram of a quadrant for the switch matrix of FIG. 11;

FIG. 13 is a block diagram of a full TDM switch including four quadrants in a ring architecture with a packet core (or another independent function), which may or may not share common functionality, disposed therein;

FIG. 14 is a block diagram of architecture of a 32×32 Memory Tile (MTile) for the quadrant of FIG. 12;

FIG. 15 is a block diagram of architecture of a 16×16 MTile for the MTile of FIG. 14;

FIGS. 16A, 16B, and 16C are block diagrams of Switch Link Protocol line encoding format; and FIG. 17 is a block diagram of a BCH2 FEC Frame format.

DETAILED DESCRIPTION OF THE INVENTION

In various exemplary embodiments, a time-space switch and Switch Link Protocol address the challenges faced in designing next generation TDM switch fabrics. Specifically, the time-space switch and Switch Link Protocol address increasing fabric switching capacity, increasing the line rate of the interconnections within the switch fabric, and increasing the level of system-on-chip (SOC) integration (e.g., by incorporating a packet switch or another independent function, which may or may not share common functionality, in the ASIC together with the TDM switch). In an exemplary embodiment, the time-space switch, realized in an ASIC, FPGA, etc., includes a new TDM switch pipelining architecture that solves the issue of how to efficiently implement a TDM switching entity around a central core of logic. Advantageously, this aspect enables combination of TDM and packet fabrics in a single device. The new pipelining architecture maintains low datapath latency to operate as a single stage switch component. The low datapath latency enables interoperability with current generation switching devices. Variously, the time-space switch is a structured, pipelined large time-space switch and method of operation resolving interconnect complexity. For example, the time-space switch results in an interconnect complexity that does not grow as the spatial dimension is increased and results in a reduction of long high fan-out nets, a quicker layout, and improved clock speed.

The time-space switch resolves the interconnect complexity of implementing a time-space switch around a large piece of unrelated functionality (which blocks interconnect through the center of the die). In an exemplary embodiment, the time-space switch may include a ring-shaped architecture that surrounds this central piece of unrelated circuitry. The time-space switch extends novel interconnect complexity to achieve even greater levels of integration in a single chip, while maintaining a reduction of long high fan-out nets, a quicker layout interval, and improved clock speed. The time-space switch may be used as a core building block in a next generation TDM switch fabric that scales from tens to hundreds of Terabits per second. The ability to implement a TDM switch fabric around a central packet core occupying the center of a die enables any high speed serial input link to be directed to either TDM or packet switch functions. By exploiting this novel pipelining architecture, TDM and packet fabric convergence may be achieved in the switch modules, allowing TDM, packet, and hybrid service line cards to coexist without restrictions. Having the time-space switch and packet fabric core share the same high speed serial connections is beneficial in minimizing the number of high speed serial interconnects, minimizing the power associated with these high speed interconnects, and maximizing the ability to route the interconnections in a card. Including both a time-space switch and a packet switch in the same ASIC device is a new concept. While TDM and packet switch cores each normally occupy the center of an ASIC, the creation of a switch pipelining architecture allows the TDM switch function to be implemented in a ring around a central piece of logic (e.g., a packet core).

In another exemplary embodiment, the Switch Link Protocol includes a new, flexible physical encoding and framing sub-layer protocol that is incorporated in the TDM switch addresses for providing flexible payload rates, as well as support for either a minimal overhead FEC protection or strong FEC protection (for higher signal loss interconnect applications). This may be referred to herein as SLPflex, i.e. Switch Link Protocol flexible. The SLPflex protocol is not confined to fixed serial data rates, fixed number of timeslots, or a single FEC option. SLPflex provides link encoding of variable length switch frames by mapping the 8B10B control characters into an 64B65B format (similar to Generic Framing Protocol-Transparent (GFP-T)), wrapping 32 65B encoded words with either an 11-bit burst error correcting code or 16 bit error correcting code, and scrambling the frame with a frame synchronous (217-1) scrambler. Advantageously, the Switch Link Protocol improves the bandwidth efficiency of the link encoding across the backplane and only requires a 3.125% increase in frequency (where 8B10B encoding requires a 25% frequency increase). In yet another exemplary embodiment, the Switch Link Protocol includes a SLP112 protocol that interoperates with switch components that use 6.25 Gbps serial rates over a backplane.

The flexible physical and framing layer allows programmable Serialized-Deserializer (SERDES) line rates for different applications. Some applications may need maximum line rate and low FEC overhead due to favorable backplane loss, while other applications may require reduced line rates and strong FEC due to a lossy interconnect application. The SLPflex link encoding may include two options for error protection on a link. One option is the legacy Fire code that is capable of correcting an error burst of up to 11 bits for each 2112-bit FEC frame may be used for higher quality backplane links. The other option is an interleaved BCH2 (Bose, Chaudhuri, Hocquenghem) code that is capable of correcting distributed errors of up to 16 bits may be used for high loss backplane links that need stronger error correction (at the expense of higher overhead and reduced throughput). Further, maximum reach is a key system objective. As the need to expand the size of the fabric increases, the number of links that are required to be routed on a printed circuit board (and system backplane) increases. The SLPflex framing layer provides flexibility in the number of timeslots (M), so that serial data rates can be varied. Not all applications need the maximum throughput, so the ability to reduce the rates may aid in backplane performance and reduced system power. Advantageously, the SLPflex framing notably supports multiple serial rates with light or strong FEC to suite different backplane loss characteristics to adapt to present and future product requirements.

Furthermore, the use of 64B65B link encoding (similar to GFP-T encoding) allows any character to be sent as a control character. The Switch Link Protocol uses control characters inside the switch frame for 'byte-stuffing' and framing within a timeslot. The 64B65B encoding used for 10 GbE does not allow control characters inside a packet. Using the time-space switch, the switch frame can maintain the framing for the collection of timeslots while allowing each timeslot to have its own framing. The link encoding uses a truncated pseudo-random-bit-sequence with a seed value chosen to balance 1's and 0's and to eliminate trouble patterns. Using a frame synchronous truncated PRBS pattern eliminates the error propagation issues encounters when using a self-synchronous scrambler. The link encoding also incorporates a Fire code that is capable of correcting an error burst of up to 11 bits for each 2112-bit FEC frame. With respect to the time-space switch fabric implementation, the time-space switch improves the maximum clock frequency of the switch fabric, and improves IC layout time by eliminating long high fan-out nets. Certain high-speed large switch fabrics may not be realizable without this implementation, and it significantly reduces implementation time (and cost).

Figure 1:
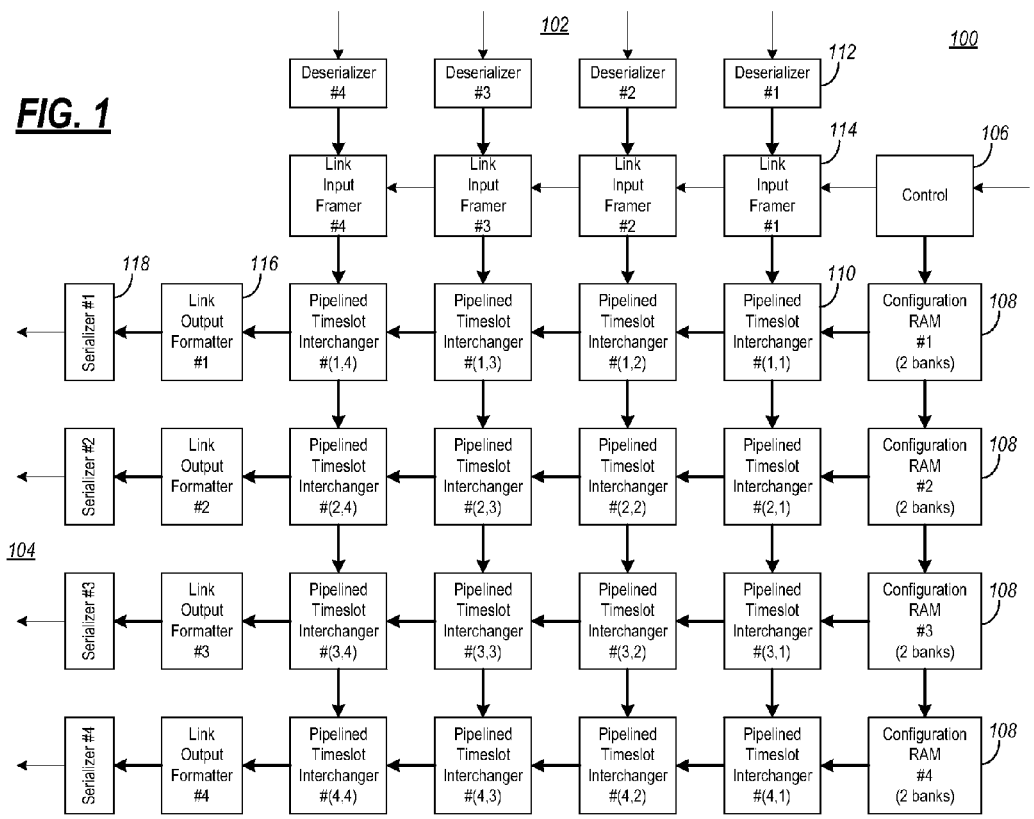
FIG. 1 is a functional block diagram of a switch matrix with serial input links at the top of the switch matrix, serial output links on the left side of the switch matrix, and control and configuration RAMs on the right side of the switch matrix.

Referring to FIG. 1, in an exemplary embodiment, a functional block diagram illustrates a switch matrix 100 with serial input links 102 at the top of the switch matrix 100, serial output links 104 on the left side of the switch matrix 100, and control 106 and configuration RAMs 108 on the right side of the switch matrix 100. Timeslot data from the input links 102 flows from top to bottom and is pipelined between each of a plurality of pipelined timeslot interchangers 110 (labeled as #(n, m) where n=1 to 4, m=1 to 4). The configuration RAMs 108 are located on the right of the switch matrix and each of the configuration RAMs 108 contains an input to output timeslot mapping for each output link 104. There are two banks of configuration memory in the configuration RAMs 108 to support hitless switching. Each of the input links 102 connect to a deserializer 112 and receive a formatted bit stream with timeslot data for each of M timeslots. The deserializers 112 connect to input link framers 114 that find the start of the switch frame and align the switch frames for all links to the first timeslot. Once the frames are aligned, the Control 106 block issues a launch signal to Link Input Framer 114 number 1 and the framer 114 begins writing the first timeslot into Pipelined Timeslot Interchanger (1, 1). One clock cycle later, the launch signal driving Link Input Framer number 2 is asserted and the framer writes the first timeslot for link number 2 into Pipelined Timeslot Interchanger (1, 2). On the same clock cycle, the second timeslot is written Pipelined Timeslot Interchanger (1, 1) while the first timeslot for Link number 1 is being written to Pipelined Timeslot Interchanger (2, 1). This process continues until the write bank of all of the Timeslot Interchangers 110 has been written with the appropriate input link's 102 timeslot data. Note that all of the timeslot interchangers 110 for a given column contain the timeslot data for the same link.

For each output timeslot, the configuration RAM 108 supplies the input link 102 and timeslot for the output link 104. The timeslot mapping address flows from right to left and is pipelined at the output of every stage of the Timeslot Interchanger 110. In addition, a data pipeline register is placed at the output of each pipelined Timeslot Interchanger 110. Depending upon the link address, each pipelined Timeslot Interchanger 110 will either forward the data from the previous stage or read the timeslot data from the Timeslot Interchanger 110 memory. When the Control 106 block issues the switch frame launch, the address of the first timeslot is presented to Configuration RAM #1 108. The configuration RAM 108 looks up the input timeslot and link for the first output timeslot on link number 1 and presents the address to Pipelined Timeslot Interchanger (1, 1). If the output timeslot address is for link number 1, then the timeslot interchanger 110 reads the timeslot data and forwards the data to the next stage. Otherwise, Pipelined Timeslot Interchanger (1, 1) will forward NULL characters. One clock cycle later, the address of the first output timeslot is presented to Configuration RAM #2 108. The configuration RAM 108 looks up the input timeslot and link for the first output timeslot on link number 1 and presents the address to Pipelined Timeslot Interchanger (2, 1). If the output timeslot address is for link number 1, then the timeslot interchanger 110 reads the timeslot data and forwards the data to the next stage. On the same clock cycle, the Configuration RAM #1 108 is supplying the address of the second timeslot to Pipelined Timeslot Interchanger (1, 1) and Pipelined Timeslot Interchanger (1, 2) is getting the address of the first timeslot from the adjacent block. The process continues until each output link formatter 116 receives all of its timeslot data as programmed in the Configuration RAM 108. The output link formatters 116 connect to serializers 118 which provide the output links 104.

In the switch matrix 100, there are N links each with M timeslots that are input from the framers 114 to the pipelined timeslot interchangers 110. In an exemplary embodiment, there are 112 timeslots which can support a switching granularity of over 50 Mbps per timeslot in switch matrix 100 that has a capacity of over 180 Gbps. In one exemplary aspect, the architecture of the switch matrix 100 is such that interconnects are vastly reduced. In particular, pipelining of the timeslot interchangers 110 enables each of the timeslot interchangers 110 to only connect to its adjacent neighbors. For example, there is no direct connection between Pipelined Timeslot Interchanger (1, 1) and Pipelined Timeslot Interchanger (4, 4). In operation, the switch matrix 100 requires each of the M timeslots from each of the N links to be available to each of the serial output links 104. As such, the pipelining of the timeslot interchangers 110 includes filling each of the timeslot interchangers 110 with each of the M timeslots from the N links. In FIG. 1, this is accomplished by starting at the Pipelined Timeslot Interchanger (1, 1) and flowing downwards and leftwards on a clock cycle basis such that each of the M timeslots from the N links is written downwards and leftwards to adjacent timeslot interchangers 110. Thus, each output link formatter 116 has available to it each of the M timeslots from the N links.

The switch matrix 100 may be implemented or realized with any of a general purpose processor or collection of processors, a content addressable memory, a digital signal processor (DSP), an application specific integrated circuit (ASIC), a field programmable gate array (FPGA), any suitable programmable logic device (PLD), discrete gate or transistor logic, discrete hardware components, or any combination thereof, designed to perform the functions described herein. There are numerous alternate exemplary embodiments. One approach may be to use a 8×8 link cascadable time-space switch as a building block for each timeslot interchanger 110. Each pipelined timeslot interchanger 110 in the switch matrix 100 would then be a 2×2 switch and would support two input links and two output links. This would half the number of pipeline stages required. Another approach may be to accept a modest amount of interconnect complexity and build each pipelined node in the switch using smaller time-space switches.

Figure 2:
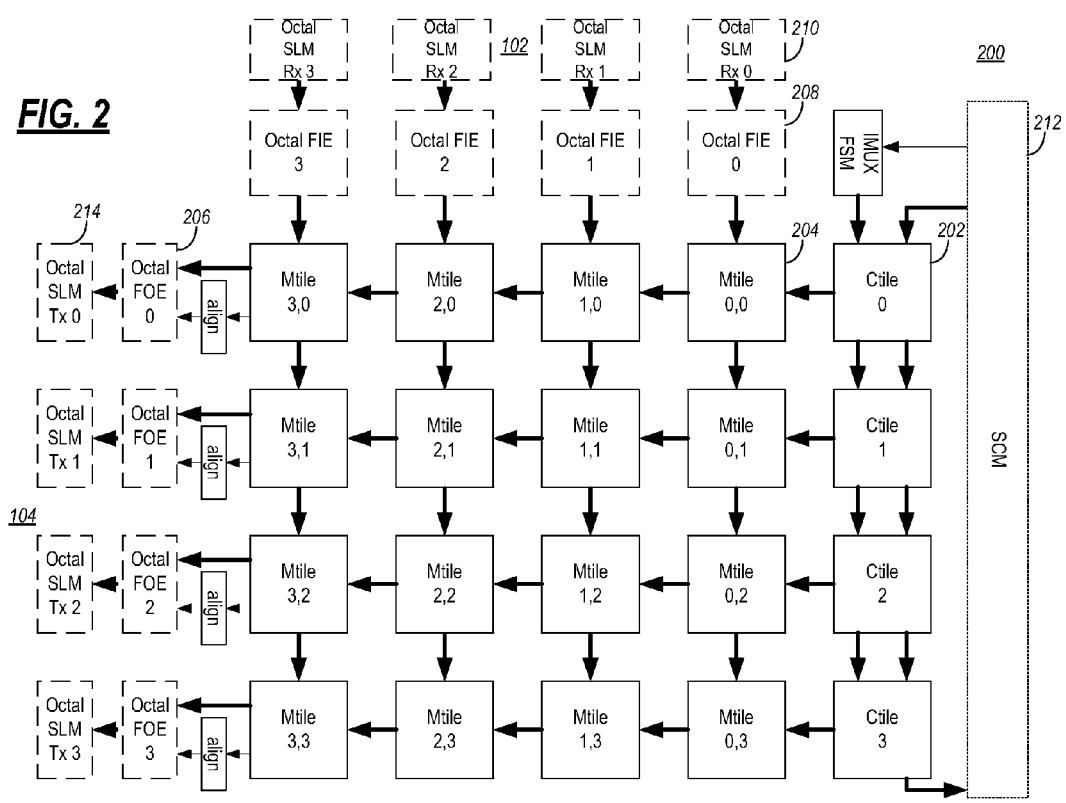
FIG. 2 is a diagram of a switch engine as a two dimensional matrix of smaller time-space switches with a 8×8 link cascadable time-space switch as a building block for each timeslot interchanger.

Referring to FIG. 2, in an exemplary embodiment, a switch engine 200 illustrates a two dimensional matrix of smaller time-space switches with a 8×8 link cascadable time-space switch as a building block for each timeslot interchanger 110. The switch engine 200 is configured to store 112 36-bit values from each of the 32 input links 102; read, write, and store the switch configuration in the configuration RAMs 108; and select any of the 3584 36-bit timeslot values for each of the 32 output links 104; The switch engine 200 includes four configuration tiles (CTiles) 202 and sixteen memory tiles (MTiles) 204. Each CTile 202 has eight configuration memories (CMEM) and maintains two banks of the input to output timeslot mapping for an Octal Frame Output Engine (FOE) block 206. Each MTile 204 has eight data memories divided into two banks; one bank is used for writing the current Extended Time Slot Group (ETSG) while the other bank is used to read the previous ETSG. Each MTile 204 is effectively an 8×8 link cascadable time-space switch. Each Octal Frame Input Engine (FIE) 208 block transmits the ETSG data from eight input links (Octal Serial Link Modules (SLM) 210) to a column of four MTiles 204. The Octal FOE 206 receives ETSG data from a row of MTiles 204. The data is pipelined between the MTiles 204 to reduce fan-out and long nets. Each Link is synchronized to write timeslot data at the same time. The FIEs 208 send data continuously from start of frame until all 12 ETSG have been sent. Each of the MTiles 204 includes enough storage to store two banks of 112 Time Slots from the four input links 102. The MTile 204 memory is organized as two blocks or banks, each of which can store a complete set of ETSG. At any one time one of these blocks is being written with new ETSG data while the other block is being read. At each ETSG boundary the blocks switch roles. Each input link 104 sends one 36-bit word every other clock cycle. Even and odd link pairs are multiplexed into a single data stream which is written into one of the write ports of a bankram (illustrated in FIG. 4).

The serial link modules (SLM) 210 are HSS (High Speed Serial) octal receiver modules, HSS octal transmitter module, and glue logic to interface to the FIEs 208, FOEs 206, and a Switch Control and Maintenance Block (SCM) 212. The SLMs 210 include eight receiver SERDES blocks and eight transmitter SERDES blocks, asynchronous First-In-First-Out buffers (FIFOs) are used to cross from the core clock domain to each serial link HSS interface clock domain. (32 receive and 32 transmit clock domains). The SERDES is configured to support a 6.25 Gbps serial data stream. The FIE 208 support a Switch Link Protocol (SLP112) switch frame format, perform word alignment, perform 64B/65B Decoding for SLP112 links, perform Fire Code Decoding and Burst Error Correction, detect and mark control character bytes, receive and buffer the incoming data to accommodate switch frame skew, calculate the switch frame cyclic redundancy check (CRC) and verify it with subsequent CRC byte, and extract the Configuration Table Select (CTS) Bytes through majority voting.

The SCM 212 contains the switch control logic and maintenance control logic, including the processor interface. The Switch Control sub-block contains the logic associated with the following functions: Generating control signals for controlling the flow of data across the FIE 208, switch engine 200, and FOE 206; Initiating switch frame generation based on external switch frame launch or Enhanced Autolaunch; Polling for CTS state at each input link and controlling Configuration RAM bank selection in the switch engine 200. The Maintenance sub-block contains the Processor Interface (PIF) and Configuration Control, including the following functions: Writing Registers for configuring each functional block; Reading Registers for error/status of each functional block; Configuring Diagnostic/Test Features; Monitoring Diagnostic/Test Results; Configuring Link Participant Status; and Generating Alarm Interrupts.

Figure 3:
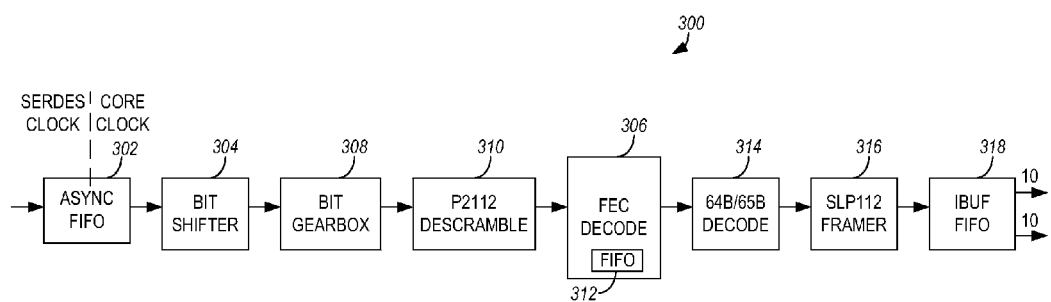
FIG. 3 is a flow diagram of data flow through a frame input engine to the switch engine of FIG. 2.

Referring to FIG. 3, in an exemplary embodiment, a flow diagram illustrates data flow 300 through the FIE 208. As described herein, the time-space switch may include link encoding of switch frames by mapping 8B10B control characters into an 64B65B format (similar to Generic Framing Protocol-Transparent (GFP-T)), wrapping 32 65B encoded words with an 11-bit error correcting code, and scrambling the frame with a frame synchronous scrambler. The time-space switch improves the bandwidth efficiency of the link encoding across the backplane and only requires a 3.125% increase in frequency (where 8B10B encoding requires a 25% frequency increase). Furthermore, the use of 64B65B link encoding (similar to GFP-T encoding) allows any character to be sent as a control character. The Switch Link Protocol uses control characters inside the switch frame for 'byte-stuffing' and framing within a timeslot. The 64B65B encoding used for 10 GbE does not allow control characters inside a packet. Using time-space switch, the switch frame can maintain the framing for the collection of timeslots while allowing each timeslot to have its own framing. The link encoding uses a truncated pseudo-random-bit-sequence with a seed value chosen to balance 1's and 0's and to eliminate trouble patterns. Using a frame synchronous truncated PRBS pattern eliminates the error propagation issues encounters when using a self-synchronous scrambler. The link encoding also incorporates a Fire code that is capable of correcting an error burst of up to 11 bits for each 2112-bit FEC frame. For example, the Fire code may be the systems and methods described in commonly assigned U.S. patent application Ser. No. 12/017,629, filed Jan. 22, 2008, and entitled "SYSTEMS AND METHODS FOR EFFICIENT PARALLEL IMPLEMENTATION OF BURST ERROR CORRECTION CODES," the contents of which are herein incorporated by reference.

The data flow 300 receives input bits at an asynchronous FIFO 302 that is split between the SERDES clock and a core clock. Bit shifter 304 logic is used to determine where the d[0] data bit of the switch frame is located in the incoming data stream. The bit shift function receives feedback from FEC decode logic 306 which indicates a bit shift of the block starting point is necessary. An arbitrary bit position is chosen to start block alignment. If the FEC block does not detect good alignment it signals to the bit shifter 304 to shift the starting bit one position. The current starting bit position is held for the number of cycles it takes to compute the syndrome of the block. Once block alignment has been achieved, the starting bit position is locked in until an out of alignment condition indicates realignment is necessary. If the FEC decode 306 logic signaled the bit shifter that realignment is necessary, the starting bit position is moved forward by one bit. A gearbox block 308 translates the data bus from the async FIFO 302 block into the data width utilized by the FEC decode 306 logic. The FEC frame includes 32 payload fields and the 32-bit Fire code parity bits.

After a link is configured and enabled, the frame alignment is rotated until FEC Block Alignment is found. When the FEC blocks are being properly decoded, the Link Receive Engine searches for the Start of Switch Frame control sequence. The FEC decoder 306 is used to synchronize with the encoded block using the synchronize by-syndrome method. The qualification process starts at an arbitrary bit position, descrambles the block, and computes the FEC syndrome of the block. If no errors are found the syndrome will be zero. If a non-zero syndrome is computed, the decoder shifts the starting bit position by one bit and repeats the test. In order to account for pipeline delays, the alignment state machine will test a particular alignment for two FEC blocks before bit slipping. As a result, the FEC block alignment should take no more than 2×2112 blocks to synchronize. FEC alignment is achieved when n blocks have been received with a zero syndrome. Once FEC alignment is established, the Start of Switch Frame (SSF) sequence is looked for. For initial link qualification, both 65-bit words in the SSF pattern must be correct for two consecutive frames. After SSF framing is established, the link asserts that it is qualified and waits for the Switch Control logic to declare the link a participant. Links that do not receive their SSF within a qualifying window are disqualified and not allowed to participate in the switch frame. If loss of alignment occurs, the bit shift logic will increment by one bit position until realignment is established.

The switch frame may be scrambled with a pseudo-noise sequence. This is necessary to ensure DC-balance, ensure sufficient transition density, and to ensure FEC block synchronization, i.e. so does not falsely synchronize to a shifted version of the codeword. Input link data is descrambled 310 prior to FEC decoding. The scrambling is across all bits of the input link FEC block including the 32-bit Fire code parity bits. The output of the scrambler is XOR'd with the input data stream. The pseudo-noise sequence is seeded with a constant pattern at the beginning of the frame and persists until the end of the frame through the parity bits. Frames may be scrambled with a frame synchronous linear feedback shift register (LFSR) scrambler. The scrambler output is applied to all bits of the FEC frame. At the start of the FEC frame, the scrambler is initialized with a seed value selected to provide DC balance across the scramble pattern. Before each FEC block (encoding or decoding) the scrambler is initialized with this state.

The FEC decoder 306 is used to synchronize with the encoded block, detect errors within blocks, and correct errors. A 32-bit Fire code is capable of correcting a single burst error of up to 11-bits. The number of correctable blocks and the number of uncorrectable errors is recorded. The FEC decoder 306 is continuously decoding FEC frames when the link is enabled. If the FEC framer receives m consecutive frames with non-zero parity, the link is declared out of frame. When the out of frame condition occurs, the FEC framer will begin to hunt for the new FEC Frame Alignment location. The FEC Framer increments 1-bit locations from the current frame location, descrambles the frame and computes the Fire Code Parity. If after receiving 2112*(N+1) bits, n frames with zero parity are not found, the framer steps to the next bit location and starts the procedure over again. A FEC FIFO 312 buffers input data while the decoder 306 determines which corrections are necessary. Output data is read out of the FIFO 312 after the last word of the FEC frame has been received and all decoding calculations are complete (121+N cycles for processing).

The data flow 300 uses a 64B/65B transcoding method similar to the method used for Transparent Generic Framing Protocol, GFP-T (ITU-T G.7041), with a 64B/65B decode block 314. Eight bit data characters and up to 16 control characters are mapped into 64B/65B blocks as show in the table below. The Flag/Transcode Bit indicates whether the block contains only 8-bit data characters or whether control characters are also present.

TABLE 1

64B/65B Transcoding

| Input Characters | Flag Bit | 64-bit (8 Octet) Field | | | | | | | |
|---|---|---|---|---|---|---|---|---|---|
| All Data | 0 | D1 | D2 | D3 | D4 | D5 | D6 | D7 | D8 |
| 7 Data, 1 Control | 1 | 0 aaa C1 | D2 | D3 | D4 | D5 | D6 | D7 | D8 |
| 6 Data, 2 Control | 1 | 1 aaa C1 | 0 bbb C2 | D3 | D4 | D5 | D6 | D7 | D8 |
| 5 Data, 3 Control | 1 | 1 aaa C1 | 1 bbb C2 | 0 ccc C3 | D4 | D5 | D6 | D7 | D8 |
| 4 Data, 4 Control | 1 | 1 aaa C1 | 1 bbb C2 | 1 ccc C3 | 0 ddd C4 | D5 | D6 | D7 | D8 |
| 3 Data, 5 Control | 1 | 1 aaa C1 | 1 bbb C2 | 1 ccc C3 | 1 ddd C4 | 0 eee C5 | D6 | D7 | D8 |
| 2 Data, 6 Control | 1 | 1 aaa C1 | 1 bbb C2 | 1 ccc C3 | 1 ddd C4 | 1 eee C5 | 0 fff C6 | D7 | D8 |
| 1 Data, 7 Control | 1 | 1 aaa C1 | 1 bbb C2 | 1 ccc C3 | 1 ddd C4 | 1 eee C5 | 1 fff C6 | 0 ggg C7 | D8 |
| All Control | 1 | 1 aaa C1 | 1 bbb C2 | 1 ccc C3 | 1 ddd C4 | 1 eee C5 | 1 fff C6 | 1 ggg C7 | 0 hhh C8 |

As shown in Table 1, for 64B/65B Transcoding, a one in the transcode/flag bit indicates that the 8-octet data field contains one or more control characters. Control characters are located at the beginning of the 64-bit payload block. The first bit of the control character contains the Last Control Character (LCC) flag bit where a zero indicates that this is the last control character. A one in the LCC bit indicates that there is another control character in the next octet. The next three bits contains the control code locator (CCL). This bit field indicates the original location of the control character with the set of eight octets. Finally, the last 4 bits of the control octet contains a 4-bit representation of the control code. The 64B/65B data within the FEC Block contains the data and control characters that make up the Switch Frame. The Switch Frame begins and ends on an encoded 65B word boundary to minimize the impact of bit errors on the Switch Frame Synchronization Sequence. The SLP112 Switch Frame is 5400 characters large, with a variable length IDLE region between switch frames, as illustrated in Table 2. The FIE framer must remove the idle pattern between SLP112 frames.

| Frame Index | Field Description |
|---|---|
| 0:15 | SSF |
| 16:23 | CRC/CTS |
| 24:471 | ETSG 0 |
| 472:919 | ETSG 1 |
| 920:1367 | ETSG 2 |
| 1368:1815 | ETSG 3 |
| 1816:2263 | ETSG 4 |
| 2264:2711 | ETSG 5 |
| 2712:3159 | ETSG 6 |
| 3160:3607 | ETSG 7 |
| 3608:4055 | ETSG 8 |
| 4056:4503 | ETSG 9 |
| 4504:4951 | ETSG 10 |
| 4952:5399 | ETSG 11 |
| 5400: | Idle (variable length) |

Table 2: Switch Frame Format

The data flow utilizes a SLP112 (Switch Link Protocol 112 time slots) frame through a framer 316. The SLP112 frame includes 12 Extended Time Slot Groups (ETSG). Each ETSG includes 112 time slots, numbered in transmission order from 0 to 111. Each timeslot includes four consecutive bytes (32 bits), which are part of the same channel. Since an ETSG includes 112 four-byte timeslots, it is 448 bytes long. Each SLP112 frame carries 48 bytes per channel, and 112 channels. The 112 time slots form 112 independent data streams that can be switched to any output link on the switch engine 200. Control characters are passed through including null value characters when no information is being sent; First byte of 10B idle sequence; etc. The Start of Switch Frame (SSF) consists of two 65B-encoded words. One of the two 65-bit patterns in the SSF must be decoded correctly to identify the start-of-frame. For initial link qualification, both 65-bit words in the SSF pattern must be error free for two consecutive frames. Once obtained, link qualification is only lost if: The link is disabled, or FEC alignment is lost.

Each switch frame contains a 32-bit CRC over the Time Slot Group (TSG) bytes of the previous frame. This CRC is located in bytes 16 to 19 of the SLP112. At the end of the frame the CRC-32 value is stored for insertion in the next frame. The Configuration Table Select (CTS) field contains the configuration table Bank Number used on the subsequent switch frame. The CTS field is located in byte 20. The field contains the pattern 0x00 to select bank 0 and 0xFF to select bank 1 switch configuration.

Each FIE block contains an input FIFO buffer IBUF 316. This FIFO compensates for skew between switch frames. Input data is stored in the FIFO after input processing (synchronization, decode, and descrambling). Read of the FIFO is controlled by switch frame launch control logic. Reading of the IBUF 316 FIFO is continuous until the end of a switch frame. Reading commences again at the next switch frame launch. IBUF read data from each input link IBUF is fanned out to all 32 switch engine blocks. Links that are unqualified will transmit Null characters (control character 0x9C) to the switch engine blocks. When the Start of Switch Frame (SSF) reaches a specified depth in the FIFO, the IBUF 316 signals to the SCM 212 module that it ready for switch frame launch. For a link to participate in a switch frame, five conditions must all be met at the time the frame launch occurs (whether the launch is a consequence of autolaunch or external launch): The link is enabled; The link is qualified (i.e. FEC and framing have been established); The start-of-frame ETSG is at the head of the FIFO; The minimum threshold has been reached; The maximum threshold has not been reached.

If a link fails to participate in a launch, an error is raised, and the IBUF 316 is flushed, and held in an inactive state until the next start-of-frame ETSG is received. The IBUF 318 FIFO is 256 locations deep by 36 bits wide. Each FIFO word includes four 8-bit data words with 1 control bit each. The control bit indicates if the 8-bit byte contains a control character. The IBUF 318 provides approximately 1.35 microseconds of jitter buffer into the IMUX fabric. The IBUF 318 is flushed and held in an inactive state when the channel is disabled.

Figure 4:
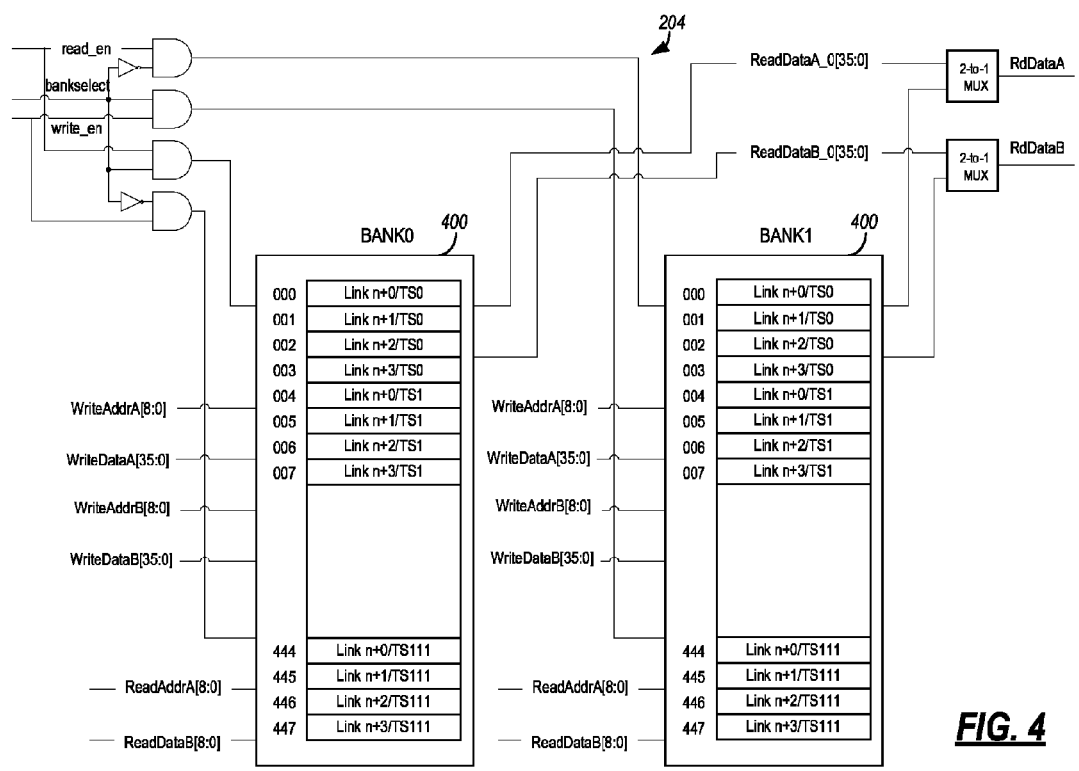
FIG. 4 is a diagram of Memory Tile bankram organization for the cascadable time-space switch building block of FIG. 7.
Figure 7:
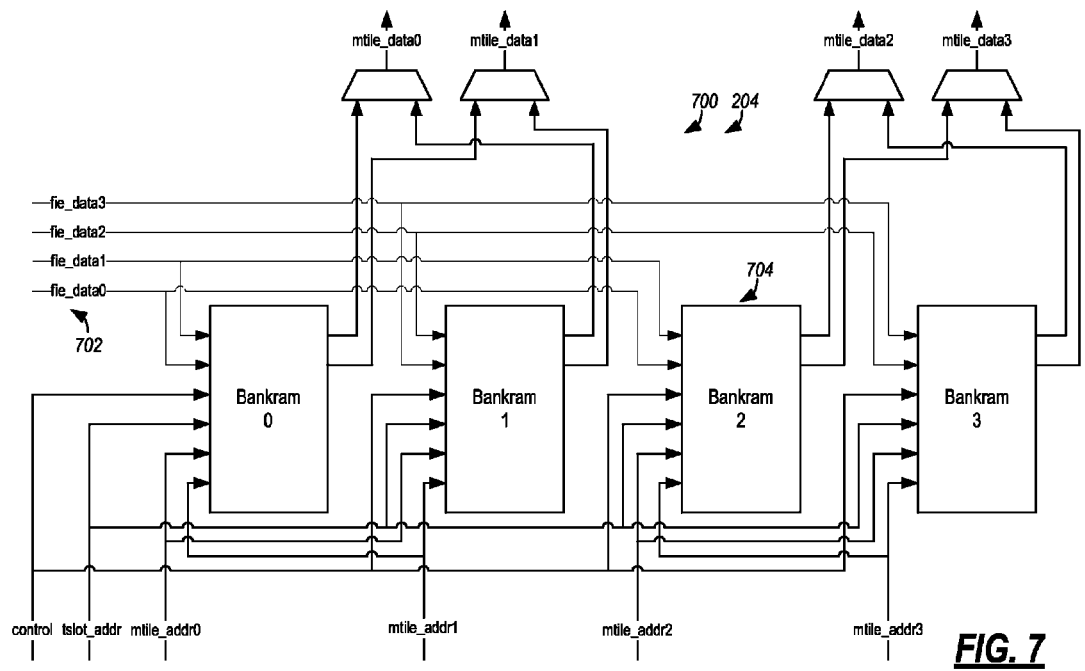
FIG. 7 is a diagram of bankram instantiation within a Memory Tile, with the data muxing and pipeline direction for the switch engine of FIG. 2.

Referring to FIG. 7, in an exemplary embodiment, a diagram illustrates MTile 204 organization. Referring to FIG. 4 in an exemplary embodiment, a diagram of timeslot organization within a bankram 400. Each bankram 704 has 2-Read Ports and 2 Write Ports with data from two links multiplexed into a single write port. Each bankram 400 memory holds timeslot data from four (4) links. While timeslot data from the current frame is being written to one bank, timeslot data from the previous frame may be read from the other bank. When all timeslots have been written into the bankram 400 memory, the read bank and write banks are swapped. The MTile Bankram 400 contains enough storage to store two banks of 112 Time Slots from 4 input links. The MTile Bankram 400 memory is organized as two blocks or banks, each of which can store a complete set of ETSG. At any one time one of these blocks is being written with new ETSG data while the other block is being read. At each ETSG boundary the blocks switch roles. Each input link sends one 36-bit word every other clock cycle. Even and odd link pairs are multiplexed into a single data stream which is written into one of the write ports of a bankram. Each of the bankrams 400 has two independent read/write ports and holds one ETSG of timeslot data for four (4) input links. On read cycles, the bankram 400 supplies the output data for a timeslot if the link address matches any of the 4 links stored in the bankram.

Figure 5:
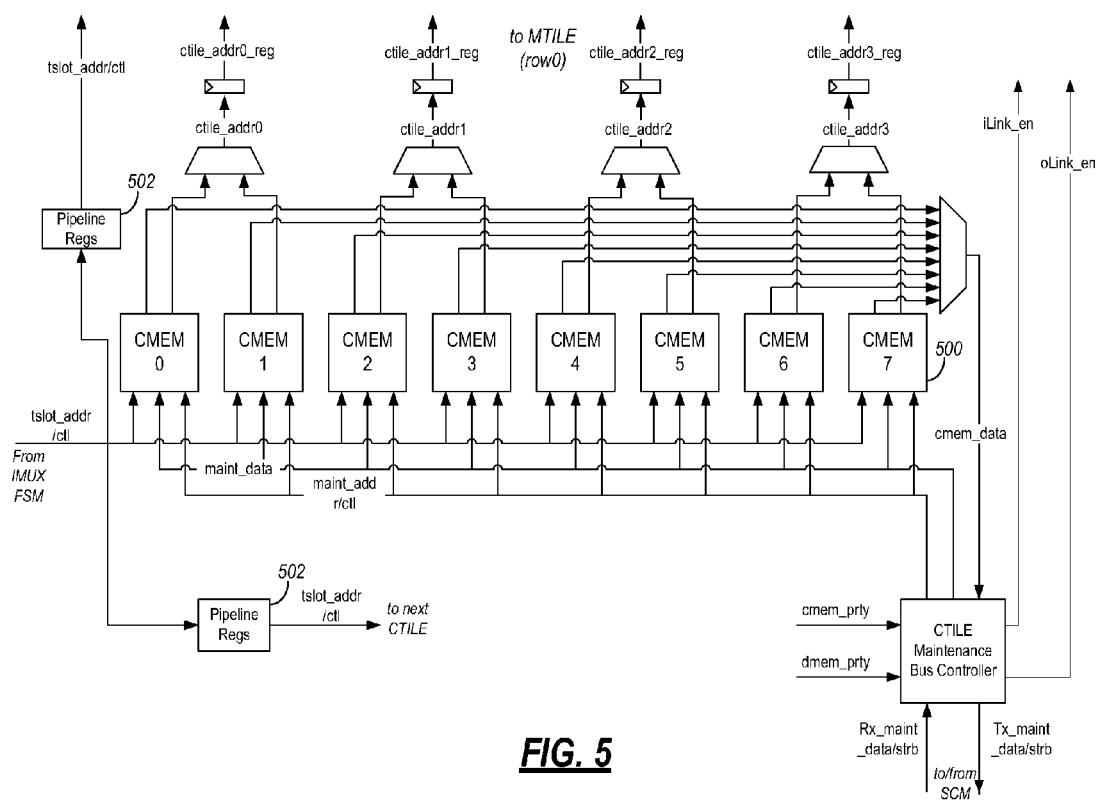
FIG. 5 is a diagram of Configuration Tile 202 organization for the switch engine of FIG. 2.

Referring to FIG. 5, in an exemplary embodiment, a diagram illustrates CTile 202 organization. The Configuration Tile (Ctile) 202 contains configuration memories 500 for eight links. Pipeline registers 502 are placed between the tiles 202 so that interconnection between adjacent blocks is required. The Configuration memory 500 stores two complete sets of Link/Timeslot indicators for each output timeslot, or 224 Link/Timeslot indicators. The Configuration memory 502 requires a Read/Write port for maintenance access and a Read port for operation. The Configuration memory 500 includes two banks, each of which holds a complete set of Link/Timeslot indicators for each output timeslot, or 112 indicators. One of these banks is the active bank while the other is inactive. The usual mode of operation is for all operational reads to be made to the active bank, while the inactive bank is configured by maintenance. The switch configuration table is 224 entries long (2 banks of 112), each entry being 13 bits wide as illustrated in Table 3:

| Bits | Field Description |
| --- | --- |
| 12 | Parity (hardware generated) |
| 11:7 | Ingress Link Select [4:0] |
| 6:0 | Ingress Time Slot Select [6:0] |

Table 3: Switch Configuration Table

Software must ensure that the configuration table has been programmed before enabling output links. Unused links are recommended to have all table entries programmed to 0x70 at start-up to force NULL characters if enabled inadvertently. A group of eight Configuration Memories 500 is collected into a CTile 202, as shown in FIG. 5. The four CTiles 202 in the switch engine 200 are pipelined to reduce fan-out and long net lengths. Each CTile 202 is uniquely addressed to provide read/write access to the CMEM memories and control bits.

Figure 6:
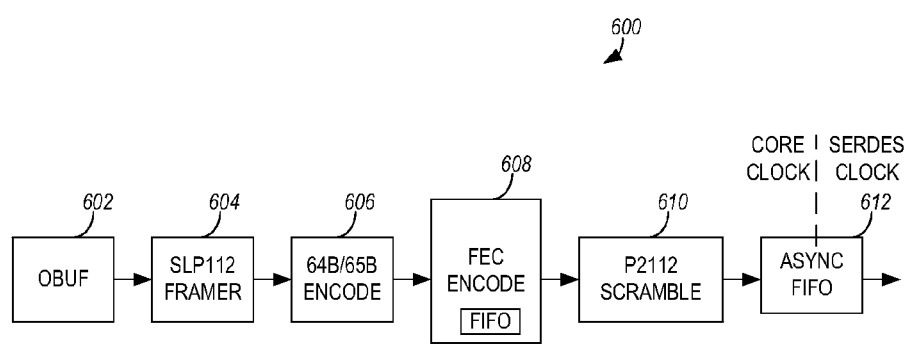
FIG. 6 is a flow diagram of data flow through a frame output engine to the switch engine of FIG. 2.

Referring to FIG. 6, in an exemplary embodiment, a flow diagram illustrates data flow 600 through the FOE 206. The FOE 206 are configured to reinsert start-of-switch-frame characters; generate SLP112 switch frames—perform 65B encoding of 64B data, insert CRC, and Firecode encoding; perform scrambling; generate IDLE sequences between frames; and the like. An Output Buffer (OBUF) 602 is a buffer designed to buffer match the data rate from the switch engine 200 (a constant 6 Gbps) to the data rate of the FOE 206. An output SLP112 604 framer recreates SLP112 switch frame format as described herein. The Start of Switch Frame characters are inserted into the first two bytes of the frame. The CRC for the previous frame is inserted and the CTS bytes are inserted. A 64B/65B encoder block 606 re-encodes 64-bit data into 65-bit payload blocks by reinserting the transcode/flag bit. A FEC encoder 608 encodes 32 65-bit code words using a (2112, 2080) systematic code. The code is a shortened cyclic Fire code. The 32 parity bits is appended to the data bits and scrambled before transmission. The link switch frame is scrambled by a scrambler 610 with the pseudo-noise sequence. The pseudo-noise sequence is seeded with a constant pattern at the beginning of the frame and persists until the end of the frame through the parity bits. Frames are scrambled with a frame synchronous LFSR scrambler. The scrambler output is applied to all bits of the FEC frame. The FOE 206 controls a transmit async FIFO 612 in Tx SLMs 214 (FIG. 2) that is responsible for synchronizing output link data from the core clock domain to the SERDES clock domain.

Referring to FIG. 7, in an exemplary embodiment, a diagram illustrates MTile 204 pipelining 700. In this diagram, input data 702 is flowing from left to right. Output timeslot data and switch addressing and control 704 flows from the bottom to the top. A Mtile Core block 706 includes four bankrams as shown in FIG. 7. Each Mtile 204 provides sufficient memory, multiplexing, and logic to support an 8-by-8 link time-space switch. A larger switch can be created using multiple Mtile blocks; an 8N-by-8N link time-space switch can be built using $N^2$ Mtile blocks. The Mtile blocks are pipelined to reduce fan-out and long nets when a larger switch is constructed. Notice that the Mtile blocks only need to communicate with adjacent blocks.

Figure 8:
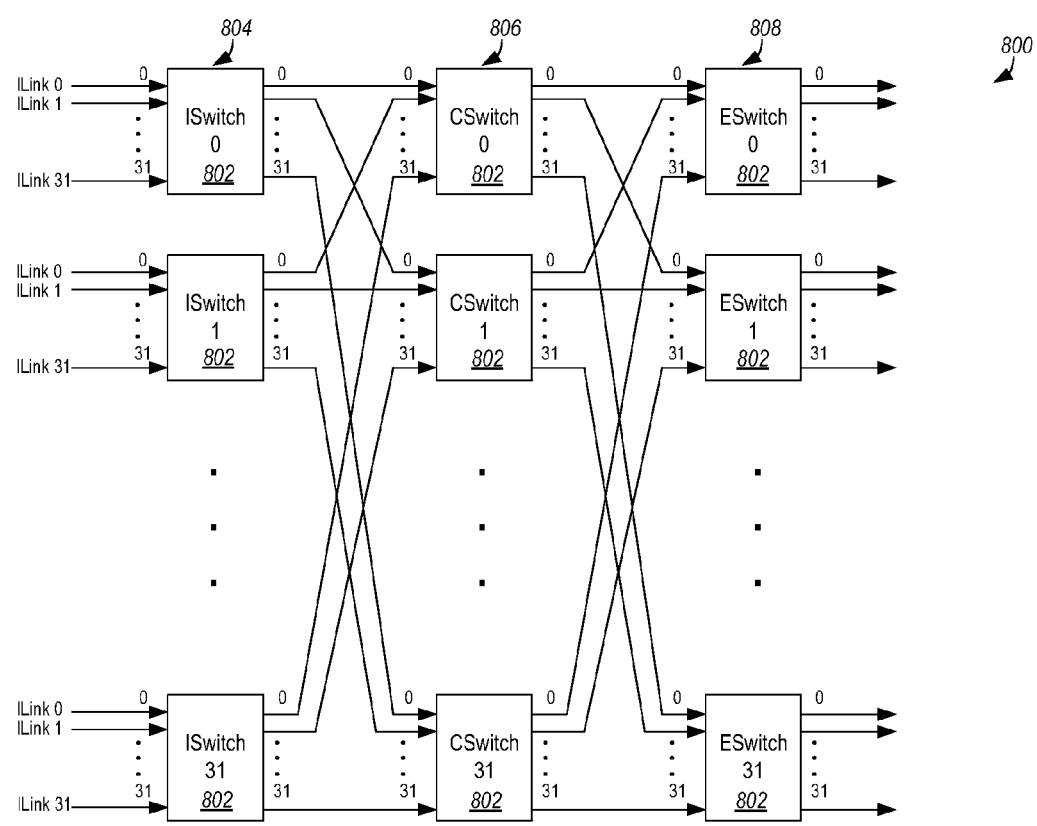
FIG. 8 is a diagram of a three-stage switch utilizing a plurality of switching devices, such as the switches in FIGS. 1 and 2.

Referring to FIG. 8, in an exemplary embodiment, a diagram illustrates a three-stage switch 800 utilizing a plurality of switching devices 802. Each of the switching devices 802 may include the switch matrix 100 or the switch engine 200. The three-stage switch 800 is a Clos switch architecture with an Ingress Switch (ISwitch) 804, a Center Switch (CSwitch) 806, and an Egress Switch (ESwitch) 808. Each of the ISwitch 804, CSwitch 806, and ESwitch 808 may include a switching device, such as the switch matrix 100 or the switch engine 200. Note, the switch matrix 100 and the switch engine 200 are configured to operate in any of these three modes, i.e. ISwitch 804, CSwitch 806, and ESwitch 808. In this configuration, each of the switching devices 802 is a 32×32 device.

Figure 9:
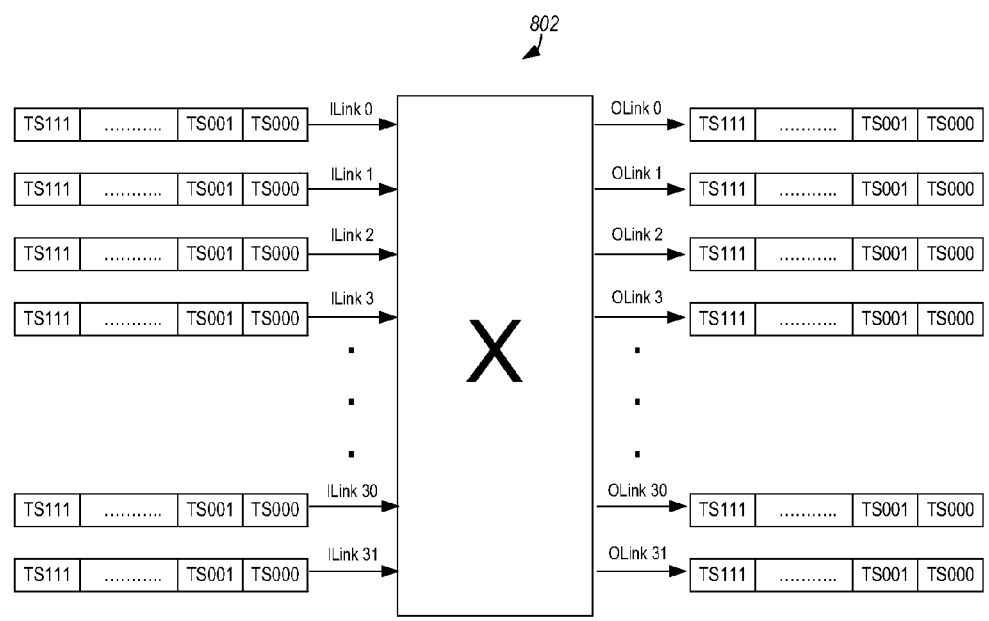
FIG. 9 is a diagram of the time-space view of TS1 granularity timeslots going into and out of any of the plurality of switching devices of FIG. 8.

Referring to FIG. 9, in an exemplary embodiment, a diagram illustrates functionality of the switching devices 802. Each input and output link to the switching device 802 carries encoded SLP112 frames at a serial data rate of 6.25 Gbps. There are 32 embedded SERDES macros on the switching device 802 that handle receive clock recovery, serial-to-parallel and parallel-to-serial conversion functions. The switching device 802 can switch up to 112 time slots on each of the 32 time multiplexed input data links to any of the 112 time slots on each of the 32 time multiplexed output data links. Logically, the switching device 802 can be viewed as a nonblocking 3584×3584 timeslot switch matrix. Each of the 3584 timeslots supports as much as 52 Mbps of bandwidth, thereby enabling the switching device 802 to support an aggregate bandwidth of approximately 180 Gbps. The generic switching device 802 can be configured to operate in ingress, egress, or center stage modes for multistage architectures. Communication to the switching device 802 is via a dedicated processor interface. Its features include: 32 embedded 6.25 Gbps SERDES data channels; SLP112 framing; Configurable 3584×3584 combination time slot interchange and spatial switch; Dual configuration bank for hitless switch-over; Configurable for multistage switch designs; Dedicated processor interface; External switch frame launch; In-band configuration table select through majority voting; and Error checking and reporting of CRC, Fire Code Corrected Errors and Uncorrectable errors, switch frame integrity, configuration table select, loss of signal, loss of alignment, IBUF overflow/underflow.

Referring to FIG. 10, in an exemplary embodiment, a diagram illustrates a switch engine 1000 for performing time-space switching. In contrast to the exemplary embodiments of FIGS. 8-9, the switch engine 1000 includes a larger size, coarser granularity, and enhanced power saving features through a write activity manager disposed within circuitry on the switch engine 1000. For example, switching granularity of the switch engine 1000 may be five times coarser. At its largest configuration, the switch engine 1000 is a 128×128 time-space switch as shown in FIG. 10. While operating at a line rate of 12.5 Gbps, the switch engine 1000 may switch any of 43 timeslots from any of the 128 input links to any timeslot in any of the 128 output links. This architecture can also be extended to higher line rates and a larger number of timeslots in future applications.

Referring to FIG. 11, in an exemplary embodiment, a functional block diagram illustrates a switch matrix 1100 for the switch engine 1000. In an exemplary embodiment, the switch engine 1000 is realized in blocks divided into four quadrants 1102, 1104, 1106, 1108 to share a die with a packet switching core (or another independent function), which may or may not share common functionality. The quadrant architecture is friendlier to a design that uses duplex SERDES macros that are spread out on all four sides. The write data may flow in a ring around the die, while read data flows only through a quadrant and out. In the switch matrix 1100, data from input framers is shown flowing vertically, and data to output framers is shown flowing horizontally. The switch matrix 100 of FIG. 1 and the switch engine 200 of FIG. 2 is a 2D array switch architecture, where input data flowed down one axis from simplex receive SERDES 112, and output data flowed across the other axis to simplex transmit SERDES 118. In the embodiment shown in FIG. 1, transmit and receive SERDES 112, 118 were separated and occupy only two sides of the die. The switch matrix 1100 includes the quadrant architecture and is based on the switch matrix 100 and the switch engine 200 2D architecture. The switch matrix 1100 may be thought of as a 2D array structure including 32×32 MTiles in a 4×4 square. Four 32×32 MTile that form output data axis of the 2D array are grouped together in a quadrant. Data written from the FIE starts at a different MTile in the 2D array however (relative to the switch matrix 100 and the switch engine 200), but otherwise still flows in a pipelined fashion to all the 32×32 MTiles.

In an exemplary embodiment, the switch engine 1000 and the switch matrix 1100 are a five timeslot switch (TS5) that has a maximum capacity of 1.46 Tbps. The switch engine 1000 and the switch matrix 1100 may include multiple operating modes including a 128 input by 128 output switch, two 64 input by 64 output switches; one 64 input by 64 output switch; and the like. For the maximum sized switch with 128 inputs and 128 outputs, the switch engine 1000 and the switch matrix 1100 operate as a configurable 5504×5504 (if using SLP43 link encoding) combination time slot interchange and spatial switch.

The switch engine 1000 and the switch matrix 1100 have increased timeslot switching granularity relative to the switch engine 100 and the switch matrix 200 (e.g., 180 bits for a TS5 timeslot versus 36 bits for a TS1 timeslot). For example, SLP112 timeslots may be switched in the switch engine 1000 and the switch matrix 1100 in groups of five. Mapping to and from timeslots may be performed outside the switch engine 1000 and the switch matrix 1100. Two banks of switch configuration are stored in configuration memory (TS5 CMEM and TS1 CMEM). Support exists for read and writes to either bank (active and standby). Error-correcting code (ECC) protection (Single Error Correction, Double Error Detection) may be included on the CMEM to protect against corruption caused by a soft error. Data read from CMEM is corrected (if one error) prior to being used by the TS5 logic. In addition to disabling inactive data memory read ports, a write activity memory is trained with datapath traffic after software has programmed the configuration memory. The write activity memory is a power saving enhancement that facilitates higher levels of integration.

A property of a time space switch is that data in any timeslot on any ingress link can be switched to any timeslot on any egress link. A high speed low latency switch needs many distributed memory copies of ingress data in the Mtiles in order to be readily available to switch to an egress link. To save memory power, a data memory is not read unless an ingress timeslot from this memory is needed. The same principle can be applied to writes to the data memory. A write activity manager within the Mtile can train on what is read from a data memory, and store this switching information in a write activity memory. The read port of the write activity memory can be synchronized to the input write port of the data memory, so that only what is being read from the data memory is written to the data memory. The write activity memory is much smaller than the data memory, so the power saved on writes to the large data memory is much greater than the power cost of the write activity memory and its associated logic. The write activity manager retrains whenever the switch configuration changes.

Referring to FIG. 12, in an exemplary embodiment, a block diagram illustrates a quadrant 1200 for the switch matrix 1100. In particular, FIG. 12 illustrates the basic dataflow in the quadrant 1200. The quadrant 1200 includes a 32 link Frame Input Engine (FIE) 1202, a 32 link Frame Output Engine (FOE) 1204, a 32 link Configuration Tile (CTile) 1206, and four 32×32 Memory Tiles (MTile) 1208. Internal pipelining to meet timing between blocks and quadrants is represented by 1210, 1212, 1214 and 1216. The FIE 1202 includes registers 1210 contained therein, and the FOE 1204 includes registers 1212 contained therein. Input write data has five levels of pipelining, of which the middle stage is in the 32×32 MTile 1208. Note, only three levels of pipelining are shown in FIG. 12. Data from a previous quadrant 1200 in a ring is received in registers 1214 for input to the MTiles 1208. Data from the MTiles 1208 is passed to registers 1216 for input to a next quadrant 1200 in the ring. The CTile 1206 provides configuration and addressing as data is pipelined through the quadrant 1200. The MTiles 1208 are TS5 switch multiplexers. Stile_In 1218 buses from the MTiles 1208 go to a STS-1 Switch 1220, which is only present in backplane quadrants. The quadrants 1200 are numbered to match modulo 32 of the input and output SERDES link numbers, namely Quadrant 0 1200 handles SERDES input/output links 0 to 31; Quadrant 1 1200 handles SERDES input/output links 32 to 63; Quadrant 2 1200 handles SERDES input/output links 64 to 95; and Quadrant 3 1200 handles SERDES input/output links 96 to 127. In an exemplary embodiment, the STS-1 Switch 1220 may be circuitry for switching elements/components to provide backward compatibility (with respect to granularity) with the switch matrix 1100. For example, the STS-1 Switch 1220 may provide functionality similar to the switch engine 200 for backward compatibility within the switch matrix 1100.

Referring to FIG. 13, in an exemplary embodiment, a block diagram illustrates a full 128×128 TDM switch 1300 including four quadrants 1200-0, 1200-1, 1200-2, 1200-3. The switch 1300 includes a ring architecture with a packet core 1302 disposed therein. The MTiles 1208 are distributed in the quadrants 1200-0, 1200-1, 1200-2, 1200-3 with quadrant FIE 1202, FOE 1204, CTile 1206, and duplex SERDES logic blocks 1304. This enables a quadrant layout that could be floorplanned identically in all four regions (i.e. corners or sides). A distributed switch layout is needed for the packet core 1302 to be placed in the middle. MTile data from a quadrant shifts counter-clockwise to the next quadrant MTile. In an exemplary embodiment, each Wr* data bus is 720 bits plus parity. There is pipelining between the quadrants. In an exemplary embodiment, the packet core 1302 utilizes the same input/output circuitry, e.g. the SERDES logic blocks 1304 as the quadrants 1200-0, 1200-1, 1200-2, 1200-3.

Referring to FIG. 14, in an exemplary embodiment, a block diagram illustrates architecture of the 32×32 MTile 1208. There are four 32×32 MTiles 1208 in a quadrant 1200 block. Write data 1400 is pipelined to propagate between quadrants 1200. The input pipelining to the quadrant and output pipelining from the quadrants are outside the 32×32 MTile 1208, and is illustrated in FIG. 12. FIG. 14 illustrates one of many write pipelining states in the 32×32 MTile 1208. Input write data 1400 is pipelined once in the 32×32 MTile 1208 as part of the write data pipelining stages between quadrant 1200 instances. A 16×16 MTile 1410 is the base building block, and there are four 16×16 MTiles 1410 instantiated per 32×32 MTile 1208. There is a read pipelining stage 1420 at the output of each 32×32 MTile 1208, which pipelines the result from either one of the 16×16 MTiles 1410 or the previous 32×32 MTile 1208 result if the timeslot does not use data from this 32×32 MTile 1208.

Referring to FIG. 15, in an exemplary embodiment, a block diagram illustrates architecture of the 16×16 MTile 1410. The 16×16 MTile 1410 uses a similar dual port memory scheme as the MTile 204. The 16×16 MTile 1410 includes two memories 1510, 1520 with enough storage to each hold 43 TS5 Time Slots worth (i.e., an Ultra Time Slot Group (UTSG) as described herein in FIG. 16) of data from 16 input links. At any one time, one of these memories 1510, 1520 is being written to on both ports with new UTSG data while the other memory 1510, 1520 is being read on both ports. At each UTSG boundary the memories switch roles. As shown in FIG. 15, each data memory (DMEM) 1510, 1520 has two independent read/write ports and holds one UTSG of timeslot data for 16 input links. Two FIE octals that multiplex data from eight input buffer memories write to DMEM together. On read cycles, the DMEM supplies the output data for a timeslot if the link field in the CMEM configuration word matches any of the 16 links stored in the DMEM. Otherwise, the read enable signal is not asserted to reduce memory power dissipation. Additionally, there is a small write activity memory per 16×16 Mtile 1410 that is used to reduce core switch power. The write activity memory (WAM) is trained to track the timeslots that are read out of the 16×16 Mtile 1410. The WAM is then used to only enable writes to the Mtile data memories for the data that is read out.

There is a 32×32 configuration tile (CTile) 1206 for every quadrant 1200. There are four configuration memory instances per CTile 1206 that have a dedicated read/write port for switch table updates, plus a dedicated read port that goes to the MTiles 1208. Each memory stores configuration for both banks (CTS=0 or CTS=1). The read port that goes to the MTiles 1208 is protected with ECC. Four configuration words per clock cycle pass between the 32×32 CTile 1206 and the first 32×32 MTile 1208 in the quadrant 1200.

Each 32×32 MTile 1208 in the quadrant 1200 stores the data in a different relative position with respect to the other quadrants 1200. Table 4 illustrates what input link data in a 32×32 MTile 1208 is stored. Links 0 to 63 map to links 64 to 127 in the 128×128 switch.

TABLE 4

| 32 × 32 Mtile Link assignments per quadrant | | | |
|---|---|---|---|
| | Mtile_0 | Mtile_1 | Mtile_2 | Mtile_3 |
| Quadrant 0 | Links 0-31 | Links 32-63 | Links 64-95 | Links 96-127 |
| Quadrant 1 | Links 32-63 | Links 64-95 | Links 96-127 | Links 0-31 |
| Quadrant 2 | Links 64-95 | Links 96-127 | Links 0-31 | Links 32-63 |
| Quadrant 3 | Links 96-127 | Links 0-31 | Links 32-63 | Links 64-95 |

Quadrant logic is meant to be identical as much as possible so that the physical layout of a quadrant 1200 can be instantiated more than once. Quadrant input pins will be used to configure it. Since the 32×32 MTile 1208 pipelining is wired to switch data as per the quadrant 0 mapping, a slight address translation on the CMEM output data needs to be done so that proper input link timeslots are mapped to output link timeslots. The upper two bits of the input link field from CMEM are changed as follows when it is passed to the 32×32 Mtile pipeline: Quadrant 0—add 0; Quadrant 1—add 3 (modulo 4); Quadrant 2—add 2 (modulo 4); and Quadrant 3—add 1 (modulo 4). Dual port RAMs are used for CMEM in the CTile 1206, where there is a processor interface side of the RAM for configuration.

Referring to FIGS. 16A, 16B, and 16C, in exemplary embodiments, block diagrams illustrate Switch Link Protocol line encoding formats. As described herein, SLPXXX refers to a Switch Link Protocol for XXX switching timeslots, e.g. 112 timeslots. FIG. 16A illustrates SLP112 encoding with TS1 granularity timeslots, FIG. 16B illustrates SLPflex encoding with 43 TS5 timeslots, and FIG. 16C illustrates SLPflex encoding with 43 TS5 timeslots using an optional Fire Code. FIGS. 3 and 6 refer to an SLP112 link encoding protocol that may be used between line and switch modules always running a constant rate (e.g., 6.25 Gbps). Compared to SLP112, SLPflex is a next generation backplane protocol that increases the line rate over the backplane. The SLPflex protocol may also be used for fiber links that connect switch modules in multi-bay configurations. SLPflex may run at 12.5 Gbps and use a stronger FEC to compensate for higher channel loss compared to 6.25 Gbps rate. Also, SLPflex has a programmable number of timeslots in case circumstances or new applications lead to a need to run at a lower or higher line rate than 12.5 Gbps. Of note, SLPflex uses some of the formatting defined for SLP112. The various embodiments of the time-space switch described herein support both SLP112 and SLPflex format on every link, and the datapath may use shared hardware framing engines for most of the sub-layers. Conceptually, the SLP112 and SLPflex frame format may be divided into two layers: a physical layer and a framing layer with the physical layer encoding encompassing 64/65B encoding, FEC encoding, P2112 scrambling, and serializing.

As described herein and referred to FIG. 16A and back to Table 2, the SLP112 Switch Frame is 5400 characters long, with a variable length IDLE region between switch frames. The frame must start and end on a 64B/65B codeword boundary. The 64B/65B encoded data within the FEC Block contains the data and control characters that make up the Switch Frame. The Switch Frame begins and ends on an encoded 65B word boundary to minimize the impact of bit errors on the Switch Frame Synchronization Sequence. The SLP112 frame contains 12 Extended Time Slot Groups (ETSG). Each ETSG includes 112 time slots, numbered in transmission order from 0 to 111. 112×4×12=5376 bytes/frame are provided at an SLP112 framing layer 1602, and 5400+8×N bytes/frame are provided to a 64/65B encoder 1604. From the encoder 1604, 32 65B codewords are provided per FEC frame, and a Fire code FEC encoder 1606 may provide 2112 bits per FEC frame which is provided to a P2112 scrambler 1608 and a serializer 1610.

Each timeslot includes four consecutive bytes (32 bits), which are part of the same channel. These bytes may be any character except K27.7 or K29.7. All other valid K-characters are permitted. Since an ETSG contains 112 four-byte timeslots, it is 448 bytes long. Each SLP112 frame carries 48 bytes per channel, and 112 channels. The 112 time slots form 112 independent data streams that can be switched to any output link on the time-space switch. In an exemplary embodiment of the time-space switch, sequential groups of five timeslots (TS5) are grouped together in the switch.

Table 5 describes the format of control characters in the switch frame format and the mapping of 64B control values to 8B control codes. This applies to both SLP112 and SLPflex frames.

TABLE 5

Format of control characters

| Character | Name | 64b Value | 8b Value | Description |
|---|---|---|---|---|
| K28.0 | | 0000 | 0x1C | |
| K28.1 | | 0001 | 0x3C | |
| K28.2 | SOF | 0010 | 0x5C | Start of frame. Start of SONET, OTN, or OPVC frame. |
| K28.3 | SOP | 0011 | 0x7C | Start of Payload. Used to indicate the Start of SONET SPE. |
| K28.4 | Null | 0100 | 0x9C | Null value character when no information being sent |
| K28.5 | Comma | 0101 | 0xBC | First byte of 10B idle sequence |
| K28.6 | | 0110 | 0xDC | |
| K28.7 | | 0111 | 0xFC | |
| K23.7 | | 1000 | 0xF7 | |
| K27.7 | SPD | 1001 | 0xFB | Start of packet delimiter is the first byte in the Start of Switch Frame sequence |
| K29.7 | EPD | 1010 | 0xFD | End of packet delimiter is the second byte in the Start of Switch Frame sequence |
| K30.7 | | 1011 | 0xFE | |
| | | 1100 | N/A | |
| | | 1101 | N/A | |
| | | 1110 | N/A | |
| | | 1111 | N/A | |

The first field in the Switch Frame is the Start of Switch frame (SSF) field. The SSF field is 16 characters long and is shown in the following table—Start of Switch Frame. This applies to both SLP112 and SLPflex frames.

TABLE 6

Start of Switch Frame

| Frame Index | Value | Description |
|---|---|---|
| 0 | K27.7 | SPD |
| 1 | K29.7 | EPD |
| 2 | 0x0F | |
| 3 | 0x0F | |
| 4 | 0x0F | |
| 5 | 0x0F | |
| 6 | 0x0F | |
| 7 | 0x0F | |
| 8 | K27.7 | SPD |
| 9 | K29.7 | EPD |
| 10 | 0xF0 | |
| 11 | 0xF0 | |
| 12 | 0xF0 | |
| 13 | 0xF0 | |
| 14 | 0xF0 | |
| 15 | 0xF0 | |

The SSF includes two 65B encoded words. The two 65-bit words contain the SPD/EPD characters followed by either 0x0f0f0f0f0f0f0f0f or 0xf0f0f0f0f0f0f0f0. This encoding is necessary because a single bit error can mangle the order of the 8 encoded bytes or cause the misinterpretation of control words as data, and vice versa.

Referring to FIG. 17, in an exemplary embodiment, each switch frame contains a 32-bit cyclic redundancy check (CRC) 1700 over the UTSG or ETSG bytes of previous frame. This applies to both SLP112 and SLPflex frames. The CRC is located in bytes 16 to 19 of the SLP112/SLPflex frame. The CRC does not cover the idle between frames, CRC, SSF, CTS, or reserved pad bytes of the previous frame. For the purpose of CRC 1700 calculation, K-characters are processed as the corresponding data characters.

Referring back to FIGS. 16A, 16B, and 16C and Table 2, the SLP112 and SLPflex include Bytes 21 to 23 as reserved bytes. They are set to 0x00 in the switch 1220 and are not checked or covered by CRC. However, these bits are protected by FEC as per all bits in the SLP112 or SLPflex frame. These bytes allow the first ETSG/UTSG to begin on a 64B/65B codeword boundary. The time-space switch normally sets Reserved bytes to 0x00 for both SLP112 and SLPflex links. A discovery mode can be enabled in time-space switch UTSX to send a source ID in this field. The 7 LSBs of the 24 bit field will include the egress link number of the device, while the upper 17 bits are programmable to include information such as card type, card number, shelf number, switch bay number, etc. The ETSG bytes may contain any characters except SPD or EPD (K27.7, or K29.7). Other K-characters are permitted. The Idle period between frames includes the pattern K28.5 followed by D16.2, repeating. The idle period must end on a 64B/65B codeword. Since the following frame must begin on a 64B/65B codeword boundary, the number of idles byte must be a multiple of 8.

Referring to FIGS. 16B and 16C, the SLPflex frame looks similar to the SLP112 frame, with the exception that the number of Time Slot Groups (TSGs) differs and is programmable. As noted above, common aspects include, for example, allowed control characters, SSF, CRC/CTS, etc. The number of TS5 in a SLPflex frame is programmable, and a TS5 is five times the TSG granularity. In an exemplary embodiment, SLP43 is a SLPflex frame that is planned to be used at the 12.5 Gbps line rate with BCH2 FEC. A SLP43 Switch Frame has 43 TS5 timeslot groups, where a TS5 timeslot is equal to 5 SLP112 timeslots (20 bytes) and ~265 Mbps of switching granularity. The name SLP215 (43*5=215) is not used to avoid implying that there are 215 timeslots with TS1 switching granularity, but rather 43 TS5 timeslot groups with less switching granularity. The SLP43 frame is 10344 characters large, with a variable length IDLE region between switch frames. 43×20×12=10320 bytes/frame are provided at an SLPflex framing layer 1620, and 10320+8×N bytes/frame are provided to a 64/65B encoder 1622 (where N is the number of IDLE words). From the encoder 1622, 121 65B codewords are provided per two BCH2 FEC frames, and a BCH2 FEC encoder 1624 may provide 4096 bits per FEC frame to a P2112 scrambler 1626 and a serializer 1628.

The SLP43 Switch frame is shown in Table 7. The SSF, CRC/CTS, IDLE and control characters are identical to what is used in SLP112, see Tables 6 and 6 for further detail.

TABLE 7

SLP43 Switch Frame Format

| Frame Index | Field Description |
|---|---|
| 0:15 | SSF |
| 16:23 | CRC/CTS Reserved (Discovery ID) |
| 24:883 | UTSG 0 |
| 884:1743 | UTSG 1 |
| 1744:2603 | UTSG 2 |
| 2604:3463 | UTSG 3 |
| 3464:4323 | UTSG 4 |
| 4324:5183 | UTSG 5 |
| 5184:6063 | UTSG 6 |
| 6064:6903 | UTSG 7 |
| 6904:7763 | UTSG 8 |
| 7764:8623 | UTSG 9 |
| 8624:9483 | UTSG 10 |
| 9484:9483 | UTSG 11 |
| 10344: | Idle (variable length) |

The SLPflex frame contains 12 Ultra Time Slot Groups (UTSG). Each UTSG includes a programmable number of TS5 TSGs, numbered in transmission order from 0 to (N_TS5-1). Each timeslot includes twenty consecutive bytes (160 bits), which are part of the same channel. These bytes may be any character except K27.7, or K29.7. All other valid K-characters are permitted. Since an UTSG contains N_TS5 twenty-byte timeslots, it is N_TS5*20 bytes long. Each SLPflex TS5 carries 240 bytes per frame. Each TS5 TSG forms an independent data stream that can be switched to any output link on the time-space switch.

Besides a difference in the timeslot granularity and the number of timeslots, SLPflex has the same framing layer attributes as SLP112. SLPflex supports the same set of control characters and has the same restrictions for control characters in the payload area. Also, the SSF is identical, and CRC covers the payload in the same way. The only difference is the SLPflex CRC covers roughly double the number of payload bytes. CTS and Reserved bytes are identical. The Reserved bytes can be used to send a source ID when in a discovery mode in the time-space switch. Inter-Frame Idle characters between frames is identical. SLPflex and SLP112 have the same interface to the 64B/65B physical layer 1604, 1622. A SLP112 and SLPflex frame can always be evenly segmented into 8 bytes to pass to the 64B/65B physical layer. Of note, the use of either a Fire Code FEC 1630 or the BCH2 FEC 1624 in the physical layer has no impact on the SLPflex framing layer.

The SLP112 physical layer includes four sub-layers: the 64B/65B sub-layer 1622, the FEC sub-layer 1624, 1630, the scrambling sub-layer 1626, and the serial sub-layer 1628. Both SLP112 and SLPflex switch link protocols use a 64B/65B transcoding method similar to the method used for Transparent Generic Framing Protocol, GFP-T (ITU-T G.7041). Eight bit data characters and up to 16 control characters are mapped into 64B/65B blocks as show in Table 1 herein. The Flag/Transcode Bit indicates whether the block contains only 8-bit data characters or whether control characters are also present.

As shown in Table 1, a logic 1 in the transcode/flag bit indicates that the 8-octet data field contains one or more control characters. Control characters are located at the beginning of the 64-bit payload block. The first bit of the control character contains the Last Control Character (LCC) flag bit where a zero indicates that this is the last control character. A one in the LCC bit indicates that there is another control character in the next octet. The next three bits contains the control code locator (CCL). This bit field indicates the original location of the control character with the set of eight octets. Finally, the last 4 bits of the control octet contains a 4-bit representation of the control code. The 64B/65B codewords are transmitted transcode-bit-first. Since the 64B/65B sub-layer is the highest of the physical sub-layers, this is the interface rate that is presented to the framing layer.

The SLP112 only uses a 2112 bit Fire Code FEC block in the encoder 1606. SLPflex allows the use of either the SLP112 Fire Code FEC, or a (512,493) 8-way interleaved BCH2 FEC code. SLPflex is expected to only use the BCH2 FEC since it is a stronger code with more coding gain. The option to use the Fire Code FEC allows lower overhead and enables more SLPflex throughput in low loss interconnect applications that do not need the strong FEC. For the Fire Code encoding 1606, serial data on the backplane is subdivided into contiguous 2112 bit Fire Code FEC blocks. These blocks include a 2080-bit FEC payload followed by a 32-bit parity. The FEC payload is transmitted before the parity. The 32 parity bits are appended to the data bits and all bits are scrambled before transmission. For example, the Fire code may be the systems and methods described in commonly assigned U.S. patent application Ser. No. 12/017,629, filed Jan. 22, 2008, and entitled "SYSTEMS AND METHODS FOR EFFICIENT PARALLEL IMPLEMENTATION OF BURST ERROR CORRECTION CODES," the contents of which are herein incorporated by reference.

Referring to FIG. 18, in an exemplary embodiment, a block diagram illustrates a BCH2 FEC Frame format 1800 for the BCH2 FEC 1624. The recommended FEC to use for 12.5 Gbps links is an interleaved BCH code for improved coding gain and burst error protection over the SLP112 Fire Code. A 2-error correcting/3-error detecting (512,493) BCH code is used through the encoder 1624. Each BCH code is 8-way bit interleaved to enhance burst error correction (corrects two bursts of 8 bits or one burst of 16 with 8-way interleaving). There is 4096 bits per FEC frame 1802, 1804, with an overhead of 152 bits parity bits per FEC frame (19*8=152). There is additional overhead in the form of a sync word 1806 in the information bytes which occurs every 2 FEC frames for frame alignment. 121-65 bit codewords plus sync word fit evenly in the information bits of two 4096 bit FEC frames. The Sync Word 1806 and Payload 1808, 1810 are covered by the FEC encoding and associated FEC overhead 1812, 1814, and the Sync Word 1806 is not scrambled.

For the SLP112/SLPflex Scrambling Sub-layer 1608, 1626, serial data on the backplane is subdivided into contiguous 2112 bit Fire Code FEC blocks for SLP112 mode, or 8192 bit BCH2 FEC superframes in SLPflex mode. Both block options are scrambled to ensure DC-balance, ensure sufficient transition density, and to ensure FEC block synchronization, i.e. so it does not falsely synchronize to a shifted version of the codeword. For SLP112 links, the PN-2112 scrambling is across all bits of the FEC block including the FEC parity bits. The output of the PN-2112 generator is XOR'd (an exclusive OR operation) with the input data stream. For SLPflex links using BCH2 FEC, the PN-2112 scrambling is across all but the sync word bits of two 8-way interleaved BCH2 FEC frames, which includes the FEC parity bits. For SLP112 links, the pseudo-noise sequence is seeded with a constant pattern at the beginning of the frame and persists until the end of the frame through the parity bits. Frames are scrambled with a frame synchronous LFSR scrambler. The scrambler output is applied to all 2112 bits of the FEC frame. For SLPflex links using Fire Code FEC, the scrambling is the same as SLP112 links. SLPflex links using BCH2 FEC have the pseudo-noise sequence seeded with a constant pattern at the beginning of the 8-way interleaved BCH2 FEC frame that has the sync word. The scrambling provides DC balance across the 8192-bit FEC block (i.e., two 4096 bit 8-way interleaved BCH2 (512,493) FEC frames).

With respect to the SLP112/SLPflex Serial Sub-layer 1610, 1228, the serial sub-layer is the format in which the data is actually transmitted over the backplane. The order of transmission is most significant bit first. The serial data rate for SLP112 links is 6250 Mbps. The serial data rate for SLPflex links is not limited to a specific rate. A rate of 12.5 Gbps is used in the exemplary embodiment since it is double the line rate for SLP112 links.

It will be appreciated that some exemplary embodiments described herein may include one or more generic or specialized processors (or "processing devices") such as microprocessors, digital signal processors, customized processors, FPGAs, ASICs, and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more ASICs, in which each function or some combinations of certain of the functions are implemented as custom logic. Of course, a combination of the two approaches may be used.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A time-space switch, comprising:
input circuitry comprising N links each receiving M timeslots;
a two-dimensional matrix of a plurality of switching circuits, wherein the two-dimensional matrix is configured to receive from the input circuitry each of the M timeslots from the N links in a pipelined manner;
output circuitry comprising N links configured to receive any of the M timeslots from any of the N links from the two-dimensional matrix; and
a Switch Link Protocol for link encoding over the input circuitry, the two-dimensional matrix, and the output circuitry;
wherein the Switch Link Protocol comprises selectable forward error correction and a flexible number of timeslots;
wherein the two-dimensional matrix is arranged in an architecture on a same integrated circuit layout; and
wherein the architecture comprises: duplex serializer-deserializer links; a plurality of Memory Tiles interconnected therebetween; a Configuration Tile disposed to a first set of the Memory Tiles; and a Frame Input Engine and a Frame Output Engine interconnected to the plurality of Memory Tiles and the duplex serializer-deserializer links.

2. The time-space switch of claim 1, wherein the architecture comprises a ring architecture on a same integrated circuit layout with an interior portion on the same integrated circuit layout for additional circuitry related to an independent function, the ring architecture comprising at least two units connected together with a connection looping back, and further comprising:
a packet switch disposed within the interior portion of the ring architecture and included in the same integrated circuit layout as the input circuitry, the two-dimensional matrix, and the output circuitry, wherein the packet switch shares high speed serial links with the time-space switch.

3. The time-space switch of claim 1, wherein the architecture comprises a ring architecture on a same integrated circuit layout with an interior portion on the same integrated circuit layout for additional circuitry related to an independent function, the ring architecture comprising at least two units connected together with a connection looping back, and further comprising:
circuitry disposed within the interior portion of the ring architecture and surrounded by the ring architecture and included in the same integrated circuit layout as the input circuitry, the two-dimensional matrix, and the output circuitry, wherein the circuitry is configured to perform functions independent of the two-dimensional matrix in the same integrated circuit layout while sharing the input circuitry and the output circuitry.

4. The time-space switch of claim 1, wherein the architecture comprises a ring architecture on a same integrated circuit layout with an interior portion on the same integrated circuit layout for additional circuitry related to an independent function the ring architecture comprising at least two units connected together with a connection looping back, and wherein, physically, the input circuitry, the two-dimensional matrix, and the output circuitry are arranged in the ring architecture, and logically, input data flows logically from the input circuitry orthogonally to the output circuitry in an offset two dimensional fashion where pipelining wraps around to a top of the two-dimensional matrix.

5. The time-space switch of claim 1, wherein the architecture comprises a ring architecture comprising four quadrants each comprising part of the input circuitry, the two-dimensional matrix, and the output circuitry, the ring architecture comprises the four quadrants connected together with a connection looping back.

6. The time-space switch of claim 5, wherein the two-dimensional matrix is partitioned into the four quadrants evenly so that each quadrant contains same switching blocks and input and output buses.

7. The time-space switch of claim 5, wherein each of the four quadrants comprises:
   duplex serializer-deserializer links;
   four Memory Tiles interconnected together;
   a Configuration Tile disposed to a first of the four Memory Tiles; and
   a Frame Input Engine and a Frame Output Engine interconnected to the four Memory Tiles and the duplex serializer-deserializer links.

8. The time-space switch of claim 7, wherein each of the four Memory Tiles is a 32×32 Memory Tile and comprises:
   a plurality of 16×16 Memory Tiles; and
   pipelining circuitry to read in and read out data from the plurality of 16×16 Memory Tiles and inputs to the 32×32 Memory Tile.

9. The time-space switch of claim 1, further comprising:
   a write activity manager configured to reduce switch power in each of the plurality of switching circuits using a write activity memory for activity synchronization with memory in the plurality of switching circuits.

10. The time-space switch of claim 1, wherein the input circuitry, the two-dimensional matrix, and the output circuitry comprise a system on a chip, and the system on a chip comprises packet switching logic disposed on the chip.

11. The time-space switch of claim 1, wherein the forward error correction comprises one of a Fire Code and a BCH2 code.

* * * * *